United States Patent
Lee et al.

(10) Patent No.: US 10,091,501 B2
(45) Date of Patent: Oct. 2, 2018

(54) VIDEO ENCODING METHOD AND APPARATUS AND VIDEO DECODING METHOD AND APPARATUS USING INTRA BLOCK COPY PREDICTION

(71) Applicant: SAMSUNG ELECTRONICS CO., LTD., Suwon-si (KR)

(72) Inventors: Sun-il Lee, Yongin-si (KR); Chan-yul Park, Suwon-si (KR); Elena Alshina, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 15/096,540

(22) Filed: Apr. 12, 2016

(65) Prior Publication Data
US 2016/0255344 A1    Sep. 1, 2016

Related U.S. Application Data

(63) Continuation of application No. PCT/KR2014/009575, filed on Dec. 13, 2014.
(Continued)

(51) Int. Cl.
*H04N 19/157* (2014.01)
*H04N 19/105* (2014.01)
(Continued)

(52) U.S. Cl.
CPC ........... *H04N 19/105* (2014.11); *H04N 19/11* (2014.11); *H04N 19/134* (2014.11);
(Continued)

(58) Field of Classification Search
CPC .. H04N 19/105; H04N 19/134; H04N 19/157; H04N 19/159; H04N 19/57
See application file for complete search history.

(56) References Cited

U.S. PATENT DOCUMENTS

2006/0013299 A1\*  1/2006  Sato .................... H04N 19/159
                                                                    375/240.03
2011/0026597 A1    2/2011  Tanaka et al.
(Continued)

FOREIGN PATENT DOCUMENTS

JP    2011-259216 A    12/2011
WO    2011/071514 A2    6/2011

OTHER PUBLICATIONS

Y. H. Huang, T. S. Ou and H. H. Chen, "Fast Decision of Block Size, Prediction Mode, and Intra Block for H.264 Intra Prediction," Aug. 2010, IEEE Transactions on Circuits and Systems for Video Technology, vol. 20, No. 8, pp. 1122-1132. (Year: 2010).\*
(Continued)

*Primary Examiner* — Robert J Hance
(74) *Attorney, Agent, or Firm* — Sughrue Mion, PLLC

(57) ABSTRACT

Provided is a video decoding method including: determining a size of a block on which intra block copy prediction is to be performed, based on block size information obtained from a bitstream; comparing the determined size of the block with a size of a current block, and determining, based on a result of the comparing, whether the size of the current block falls within the determined size of the block; and performing intra block copy prediction on the current block when it is determined that the size of the current block falls within the determined size of the block.

13 Claims, 25 Drawing Sheets

Related U.S. Application Data

(60) Provisional application No. 61/890,468, filed on Oct. 14, 2013, provisional application No. 61/890,205, filed on Oct. 12, 2013.

(51) Int. Cl.
| | |
|---|---|
| *H04N 19/134* | (2014.01) |
| *H04N 19/159* | (2014.01) |
| *H04N 19/176* | (2014.01) |
| *H04N 19/96* | (2014.01) |
| *H04N 19/593* | (2014.01) |
| *H04N 19/11* | (2014.01) |
| *H04N 19/57* | (2014.01) |

(52) U.S. Cl.
CPC ......... *H04N 19/157* (2014.11); *H04N 19/159* (2014.11); *H04N 19/176* (2014.11); *H04N 19/57* (2014.11); *H04N 19/593* (2014.11); *H04N 19/96* (2014.11)

(56) References Cited

U.S. PATENT DOCUMENTS

| | | | |
|---|---|---|---|
| 2011/0142132 A1* | 6/2011 | Tourapis | H04N 19/597 375/240.16 |
| 2013/0089265 A1 | 4/2013 | Yie et al. | |
| 2013/0129237 A1* | 5/2013 | Yie | G06T 9/004 382/233 |
| 2013/0251279 A1* | 9/2013 | Park | G06T 9/004 382/238 |
| 2014/0362917 A1* | 12/2014 | Joshi | H04N 19/46 375/240.13 |

OTHER PUBLICATIONS

Soonwoo Choi et al., "A fast prediction-mode decision algorithm for enhancing the performance of the H.264 Intra encoder", 2011 Fall Conference of IEEK, Nov. 2011, 5 pages total.
Seong-uk Hong et al., "New Intra Compression Technique", Journal of Broadcast Engineering, vol. 15, No. 4, Dec. 2010, 13 pages total.
ISR dated Jan. 19, 2015 issued in Int. Application PCT/KR2014/009575 (PCT/ISA/210).

\* cited by examiner

CODING UNIT (1010)

VIDEO ENCODING METHOD AND APPARATUS AND VIDEO DECODING METHOD AND APPARATUS USING INTRA BLOCK COPY PREDICTION

TECHNICAL FIELD

The present invention relates to a video encoding method and a video decoding method. Specifically, the present invention relates to an intra block copy prediction method.

BACKGROUND ART

As hardware for reproducing and storing high resolution or high quality video content is being developed and supplied, a need for a video codec for effectively encoding or decoding the high resolution or high quality video content is increasing. According to a video codec of the related art, a video is encoded according to a limited encoding method based on coding units of a tree structure.

Image data of a spatial domain is transformed into coefficients of a frequency domain via frequency transformation. According to a video codec, an image is split into blocks of predetermined size, discrete cosine transformation (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

An intra block copy prediction technique is a technique in which an inter prediction technique based on motion estimation and compensation is applied to intra prediction. Video encoding/decoding apparatuses may improve encoding/decoding efficiency by using the intra block copy prediction technique, thereby reducing a data amount of video.

DETAILED DESCRIPTION OF THE INVENTION

Technical Problem

The present invention aims to increase encoding efficiency and reduce computational complexity by appropriately limiting a search range of a block to which an intra block copy prediction technique is to be applied and a search range of a reference block to be used for the intra block copy prediction technique.

Technical Solution

A video decoding method according to various embodiments includes: determining a size of a block on which intra block copy prediction is to be performed, based on block size information obtained from a bitstream; comparing the determined size of the block with a size of a current block, and determining, based on a result of the comparing, whether the size of the current block falls within the determined size of the block; and performing intra block copy prediction on the current block when it is determined that the size of the current block falls within the determined size of the block.

Advantageous Effects of the Invention

According to various embodiments, it is possible to increase encoding efficiency and reduce computational complexity by appropriately limiting a search range of a block to which an intra block copy prediction technique is to be applied and a search range of a reference block to be used for the intra block copy prediction technique.

BEST MODE

Figure 1:
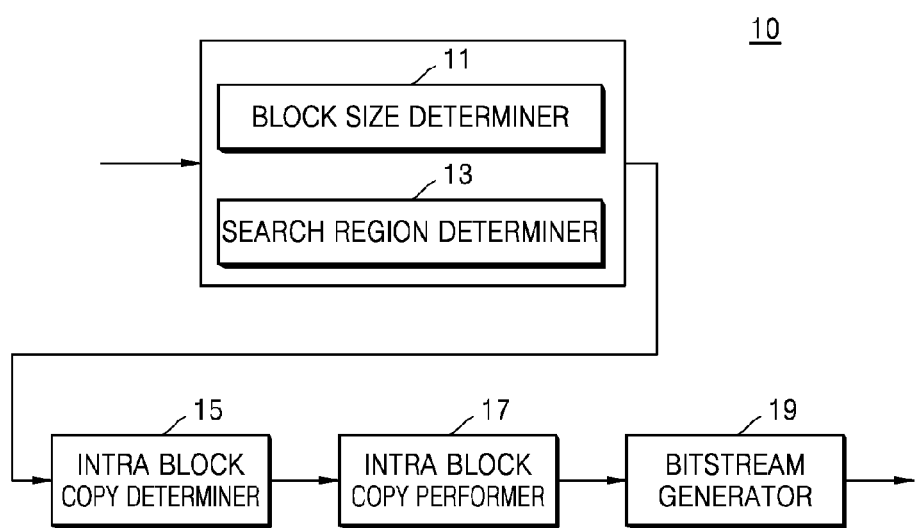
FIG. 1 illustrates a block diagram of an intra block copy predictor 10 included in a video encoding apparatus 100, according to various embodiments.

The present invention aims to increase encoding efficiency and reduce computational complexity by appropriately limiting a search range of a block to which an intra block copy prediction technique is to be applied and a search range of a reference block to be used for the intra block copy prediction technique.

As a technical means for achieving the above technical problems, a first aspect of the present invention may provide a video decoding method including: determining a size of a block on which intra block copy prediction is to be performed, based on block size information obtained from a bitstream; comparing the determined size of the block with a size of a current block, and determining, based on a result of the comparing whether the size of the current block falls within the determined size of the block; and performing intra block copy prediction on the current block when it is determined that the size of the current block falls within the determined size of the block.

Also, the video decoding method may further include determining a search range of a reference block corresponding to the current block, based on search region information obtained from the bitstream, wherein the performing of the intra block copy prediction may include: determining a reference block indicated by a motion vector within the determined search range; and performing the intra block copy prediction on the current block by using the determined reference block.

Also, the determining of the size of the block may include determining a range of a block size.

Also, the determining of the size of the block may include determining the size of the block based on a preset profile/level or a combination of the preset profile/level and the block size information.

Also, the block size information may be generated based on a user input or characteristics of an input image.

Also, the determining of the search range may include determining the search range based on a preset profile/level or a combination of the preset profile/level and the search region information.

Also, the determined search range may be an entire slice including all samples that have been decoded so far.

Also, the determined search range may be at least one of a largest coding unit (LCU) including the current block and an LCU adjacent to the current block.

Also, a second aspect may provide a video encoding method including: determining a size of a block on which intra block copy prediction is to be performed, and generating block size information based on the determined size; comparing the determined size of the block with a size of a current block, and determining, based on a result of the comparing, whether the size of the current block falls within the determined size of the block; performing intra block copy prediction on the current block when it is determined that the size of the current block falls within the determined size of the block; and generating a bitstream including the block size information, and residual data and motion vector data that are generated as a result of performing the intra block copy prediction.

Also, the video encoding method may further include determining a search range of a reference block corresponding to the current block, and generating search region information based on the search range, wherein the performing of the intra block copy prediction may include detecting a reference block within the determined search range, and performing intra block copy prediction on the current block by using the detected reference block, and the generating of the bitstream may include generating the bitstream that further includes the search region information.

Also, the determined size of the block may be determined based on a preset profile/level, characteristics of an input image, a user input, or combinations thereof.

Also, the determined search range may be determined based on a preset profile/level, characteristics of an input image, a user input, or combinations thereof.

Also, the determined search range may be at least one of a largest coding unit (LCU) including the current block and an LCU adjacent to the current block.

Also, a third aspect may provide a video decoding apparatus including: a block size determiner configured to determine a size of a block on which intra block copy prediction is to be performed, based on block size information obtained from a bitstream; an intra block copy determiner configured to compare the determined size of the block with a size of a current block, and determine, based on a result of the comparing, whether the size of the current block falls within the determined size of the block; and an intra block copy performer configured to perform intra block copy prediction on the current block when it is determined that the size of the current block falls within the determined size of the block.

Also, a fourth aspect may provide a video encoding apparatus including: a block size determiner configured to determine a size of a block on which intra block copy prediction is to be performed, and generate block size information based on the determined size; an intra block copy determiner configured to compare the determined size of the block with a size of a current block, and determine, based on a result of the comparing, whether the size of the current block falls within the determined size of the block; an intra block copy performer configured to perform intra block copy prediction on the current block when it is determined that the size of the current block falls within the determined size of the block; and a bitstream generator configured to generate a bitstream including the block size information, and residual data and motion vector data that are generated as a result of performing the intra block copy prediction.

MODE OF THE INVENTION

Hereinafter, a video encoding method and a video decoding method using an intra block copy prediction technique, according to various embodiments, are proposed with reference to FIGS. 1 through 5. Also, a video encoding method and a video decoding method based on coding units of a tree structure, according to various embodiments, which are applicable to the video encoding method and the video decoding method proposed above, are disclosed with reference to FIGS. 6 through 18. Also, various embodiments, to which the video encoding method and the video decoding method proposed above are applicable, are disclosed with reference to FIGS. 19 through 25.

Hereinafter, an 'image' may indicate a still image of a video or a moving picture, i.e., the video itself.

Hereinafter, a 'sample' means data that is allocated to a sampling position of an image and is a processing target. For example, pixels or residuals in an image in a spatial domain may be samples.

First, a video encoding apparatus and a video encoding method, and a video decoding apparatus and a video decoding method, according to various embodiments, are disclosed with reference to FIGS. 1 through 5.

FIG. 1 illustrates a block diagram of an intra block copy predictor 10 included in a video encoding apparatus 100, according to various embodiments.

The intra block copy predictor 10 of the video encoding apparatus 100 according to various embodiments may include a block size determiner 11, a search region determiner 13, an intra block copy determiner 15, an intra block copy performer 17, and a bitstream generator 19. The video encoding apparatus 100 may encode images and output a bitstream including encoded data of the images.

The video encoding apparatus 100 according to various embodiments may encode an image according to each block. A type of a block may be a square, a rectangle, or a random geometric shape. The block is not limited to a data unit of a constant size. The block may be a largest coding unit, a coding unit, a prediction unit, a transformation unit, etc. from among coding units of a tree structure. A largest coding unit including coding units of a tree structure may be variously called a coding block tree, a block tree, a root block tree, a coding tree, a coding root, or a tree trunk. Video encoding and decoding methods using the coding units of the tree structure will be described with reference to FIGS. 6 through 18.

The video encoding apparatus 100 according to various embodiments may generate symbol data by performing source coding operations including inter prediction or intra prediction on the images. The symbol data represents a sample value of each encoding parameter and a sample value of the residual.

For example, the video encoding apparatus 100 may generate symbol data by performing the inter prediction or intra prediction, transformation, and quantization on samples of a data unit of the images, and may generate a bitstream by performing entropy encoding on the symbol data.

The video encoding apparatus 100 according to various embodiments may perform the intra prediction by using an intra block copy prediction technique. The intra block copy prediction technique is an effective technique for increasing encoding/decoding efficiency.

The video encoding apparatus 100 according to various embodiments may limit a size of a block to which the intra block copy prediction technique is to be applied, so as to increase encoding efficiency. For example, the video encoding apparatus 100 may limit the size of the block to which the intra block copy prediction technique is to be applied, based on a preset profile/level, characteristics of an input image, a user input, or combinations thereof.

Also, the video encoding apparatus 100 according to various embodiments may limit a search region of a reference block that is used to perform the intra block copy prediction technique. For example, the video encoding apparatus 100 may limit a search range of the reference block to be used for the intra block copy prediction technique, based on a preset profile/level, characteristics of an input image, a user input, or combinations thereof.

Hereinafter, the operation of the video encoding apparatus 100 by taking into account intra block copy prediction will be described in detail with reference to FIG. 2.

Figure 2:
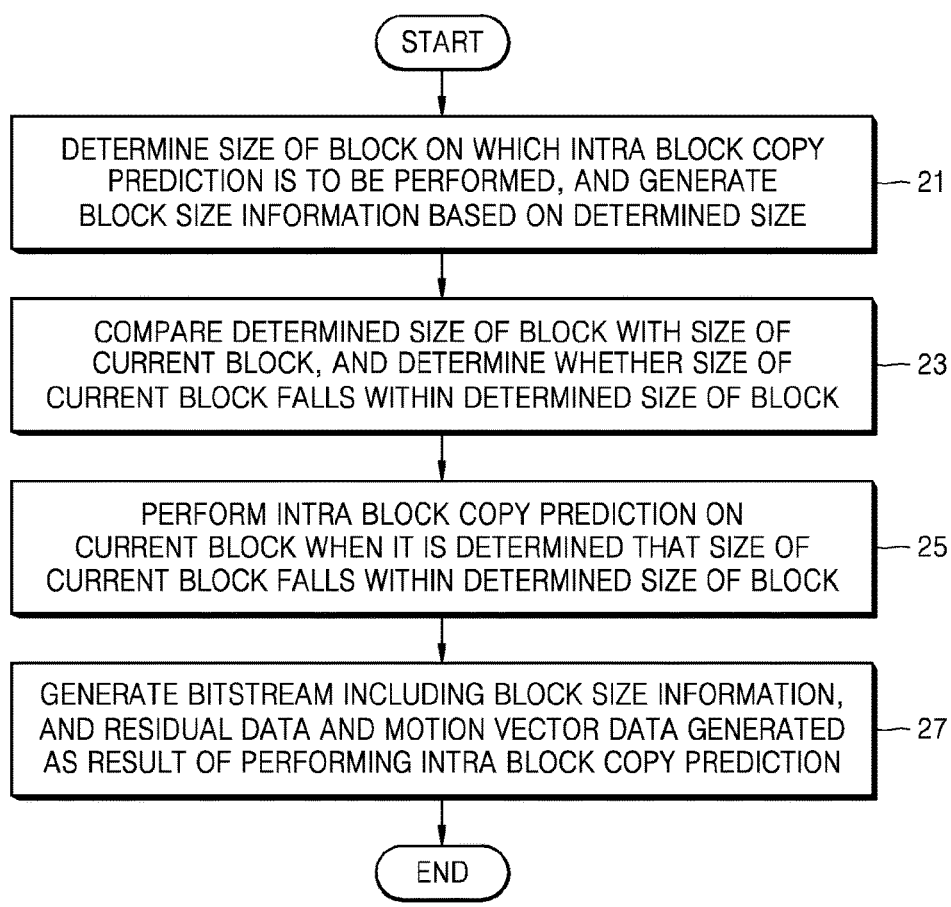
FIG. 2 is a flowchart of a method of encoding a video by using an intra block copy prediction technique, according to various embodiments.

FIG. 2 is a flowchart of a method of encoding a video by using an intra block copy prediction technique, according to various embodiments.

In operation 21, the block size determiner 11 may determine a size of a block on which intra block copy prediction is to be performed, and generate block size information based on the determined size.

According to various embodiments of the present invention, the block size determiner 11 may determine a size of a block to which the intra block copy prediction is to be applied. For example, the block size determiner 11 may determine the size of the block to which the intra block copy prediction is to be applied, based on a preset profile/level, a user input, characteristics of an image, or combinations thereof.

According to various embodiments, the block size determiner 11 may determine the size of the block to which the intra block copy prediction is to be applied, based on a preset profile/level. For example, in a case where a color format of 4:4:4 is set to the preset profile/level, the block size determiner 11 may determine "8×8 to 16×16" as the size of the block to which the intra block copy prediction is to be applied. Also, in a case where a color format of 4:2:0 is set to the preset profile/level, the block size determiner 11 may determine "8×8" as the size of the block to which the intra block copy prediction is to be applied.

The block size determiner 11 is not limited to the above embodiment and may determine various sizes as the size of the block to which the intra block copy prediction is to be applied. For example, the block size determiner 11 may determine a specific value or a specific range as the size of the block to which the intra block copy prediction is to be applied, based on a preset profile/level. For example, the block size determiner 11 may determine 8×8, 16×16, above 8×8, below 16×16, or 8×8 to 16×16 as the size of the block to which the intra block copy prediction is to be applied, but is not limited thereto. "above 8×8" means a size greater than 8×8, and "below 16×16" means a size less than 16×16. Also, "8×8 to 16×16" means a size greater than 8×8 and less than 16×16.

According to various embodiments of the present invention, the block size determiner 11 may determine the size of the block to which the intra block copy prediction is to be applied, based on a user input. For example, the block size determiner 11 may determine 8×8, 16×16, above 8×8, below 16×16, or 8×8 to 16×16 as the size of the block to which the intra block copy prediction is to be applied, based on the user input, but is not limited thereto According to various embodiments of the present invention, the block size determiner 11 may determine the size of the block to which the intra block copy prediction is to be applied, based on characteristics of an input image. For example, when the input image is a screen content video, the block size determiner 11 may determine a greater size than that when a general video image is input, as the size of the block to which the intra block copy prediction is to be applied. The screen content may include an image or a moving picture generated/rendered by various electronic devices, such as a computer or a smart phone.

According to various embodiments of the present invention, the block size determiner 11 may determine the size of the block to which the intra block copy prediction is to be applied, based on a combination of a preset profile/level, a user input, and characteristics of an image. For example, the block size determiner 11 may determine a maximum size of the block to which the intra block copy prediction is to be applied, based on the preset profile/level, and may determine the size of the block to which the intra block copy prediction is to be applied, within the determined maximum size, based on the user input. The block size determiner 11 is not limited to the above-described method and may determine the size of the block to which the intra block copy prediction is to be applied, by using various combinations.

According to various embodiments of the present invention, the block size determiner 11 may generate block size information based on the determined size of the block to which the intra block copy prediction is to be applied. The block size information means information about the size of the block to which the intra block copy prediction is applicable. For example, the block size information may be generated and encoded in the form of a block size syntax element indicating the determined size of the block.

According to various embodiments of the present invention, the search region determiner 13 may determine a search range of a reference block that is used to perform intra block copy prediction. For example, the search region determiner 13 may determine the search range of the reference block to be used for the intra block copy prediction, based on a preset profile/level, a user input, characteristics of an image, or combinations thereof.

According to various embodiments of the present invention, the search region determiner 13 may determine the search range of the reference block to be used for the intra block copy prediction, based on the preset profile/level. For example, when a color format of 4:4:4 is set to the profile/level, the search region determiner 13 may determine two recently encoded largest coding units (LCUs) as the search range of the reference block. Also, when a color format of 4:2:0 is preset to the profile/level, the search region determiner 13 may determine an LCU including a current block as the search range of the reference block.

The search region determiner 13 is not limited to the above embodiment and may variously determine the search range of the reference block. For example, the search region determiner 13 may determine a current LCU, the current LCU and a left LCU, the current LCU and a rightmost fourth column of the left LCU, or an entire slice including all samples that have been encoded so far, as the search range of the reference block, based on the preset profile/level, but is not limited thereto.

According to various embodiments of the present invention, the search region determiner 13 may determine the search range of the reference block to be used for the intra block copy prediction, based on the user input. For example, the search region determiner 13 may determine a current LCU and a left LCU, the current LCU and a rightmost fourth column of the left LCU, or an entire slice including all samples that have been encoded so far, as the search range of the reference block, based on the user input, but is not limited thereto.

According to various embodiments of the present invention, the search region determiner 13 may determine the search range of the reference block to be used for the intra block copy prediction, based on characteristics of an input image. For example, when the input image is a screen content video, the search region determiner 13 may determine a wider search range than that when a general video image is input, as the search range of the reference block.

According to various embodiments of the present invention, the search region determiner 13 may determine the search range of the reference block to be used for the intra block copy prediction, based on a combination of a preset profile/level, a user input, and characteristics of an image. For example, the search region determiner 13 may determine a maximum search range based on the preset profile/level, and determine the search range of the reference block within the determined maximum search range, based on the user input. The search region determiner 13 is not limited to the above-described method and may determine the search range of the reference block to be used for the intra block copy prediction, by using various combinations.

According to various embodiments of the present invention, the search region determiner 13 may generate search region information based on the determined search range of the reference block. The search region information means information about the search range of the reference block. For example, the search region information may be generated and encoded in the form of a search region syntax element indicating the determined search region.

In operation 23, the intra block copy determiner 15 may compare the size of the block to which the intra block copy prediction is to be applied, which is determined by the block size determiner 11, with the size of the current block, and determine, based on a result of the comparing, whether the size of the current block falls within the determined size of the block.

According to various embodiments of the present invention, when the size of the block to which the intra block copy prediction is to be applied, which is determined by the block size determiner 11, has a specific value and the size of the current block is equal to the specific value, the intra block copy determiner 15 may determine that the size of the current block falls within the determined size of the block. For example, when the determined size of the block is 8×8 and the size of the current block is 8×8, the intra block copy determiner 15 may determine that the size of the current block falls within the determined size of the block.

According to various embodiments, when the size of the block, which is determined by the block size determiner 11, is in a specific range and the size of the current block falls within the determined specific range, the intra block copy determiner 15 may determine that the size of the current block falls within the determined size of the block. For example, when the determined size of the block is "8×8 to 32×32" and the size of the current block is 16×16, it may be determined that the size of the current block falls within the determined size of the block.

In operation 25, when it is determined that the size of the current block falls within the size of the block, which is determined by the block size determiner 11, the intra block copy performer 17 may perform the intra block copy prediction on the current block.

According to various embodiments, when it is determined that the size of the current block falls within the determined size of the block, the intra block copy performer 17 may perform the intra block copy prediction. The intra block copy prediction is a technology in which an inter prediction technique based on motion estimation and compensation using a motion vector is applied to intra prediction. For example, the intra block copy performer 17 may detect the reference block corresponding to the current block within a screen. Also, a motion vector may be generated by using a position of the reference block detected within the screen and a position of the current block, and residual data may be generated by comparing data of the detected reference block with data of the current block.

When it is determined that the size of the current block falls within the determined size of the block, the intra block copy performer 17 may detect the reference block to be used for the intra block copy prediction. For example, the intra block copy performer 17 may detect the reference block within the search range of the reference block, which is determined by the search region determiner 13.

For example, when the search range determined by the search region determiner 13 is the current LCU, the intra block copy performer 17 may detect the reference block within the current LCU. Also, when the search range determined by the search region determiner 13 is the current LCU and the left LCU, the intra block copy performer 17 may detect the reference block within the current LCU and the left LCU.

According to various embodiments of the present invention, the intra block copy performer 17 may perform the intra block copy prediction on the current block by using the detected reference block. For example, the intra block copy performer 17 may generate motion vector data by comparing the position of the detected reference block with the position of the current block, and may generate residual data by comparing data of the detected reference block with data of the current block.

In operation 27, the bitstream generator may generate a bitstream including the block size information, and the residual data and the motion vector data that are generated as a result of performing the intra block copy prediction.

According to various embodiments, the bitstream generator 19 may generate a bitstream including the residual data and the motion vector data that are generated by performing the intra block copy prediction. Also, the generated bitstream may include the block size information generated by the block size determiner 11 and the search region information generated by the search region determiner 13.

The video encoding apparatus 100 according to an embodiment of the present invention may include a central processor (not shown) that generally controls the block size determiner 11, the search region determiner 13, the intra block copy determiner 15, the intra block copy performer 17, and the bitstream generator 19. Alternatively, each of the block size determiner 11, the search region determiner 13, the intra block copy determiner 15, the intra block copy performer 17, and the bitstream generator 19 may be driven by its own processor (not shown), and the processors (not shown) may interoperate with each other, so that the video encoding apparatus 100 may operate. Alternatively, according to control by an external processor (not shown) of the video encoding apparatus 100, the block size determiner 11, the search region determiner 13, the intra block copy determiner 15, the intra block copy performer 17, and the bitstream generator 19 may be controlled.

The video encoding apparatus 100 may include one or more data storage units (not shown) for storing input and output data of the block size determiner 11, the search region determiner 13, the intra block copy determiner 15, the intra block copy performer 17, and the bitstream generator 19. The video encoding apparatus 100 may include a memory controller (not shown) that manages an input and output of data of the one or more data storage units (not shown).

In order to output a video encoding result, the video encoding apparatus 100 may operate in connection with an internal video encoding processor or an external video encoding processor so as to perform a video encoding operation including transformation. The internal video encoding processor of the video encoding apparatus 100 may be a separate processor capable of performing a video encoding operation. Also, the video encoding apparatus 100, a central processing unit (CPU), or a graphics processing unit (GPU) includes a video encoding processing module and thus performs a basic video encoding operation.

Figure 3:
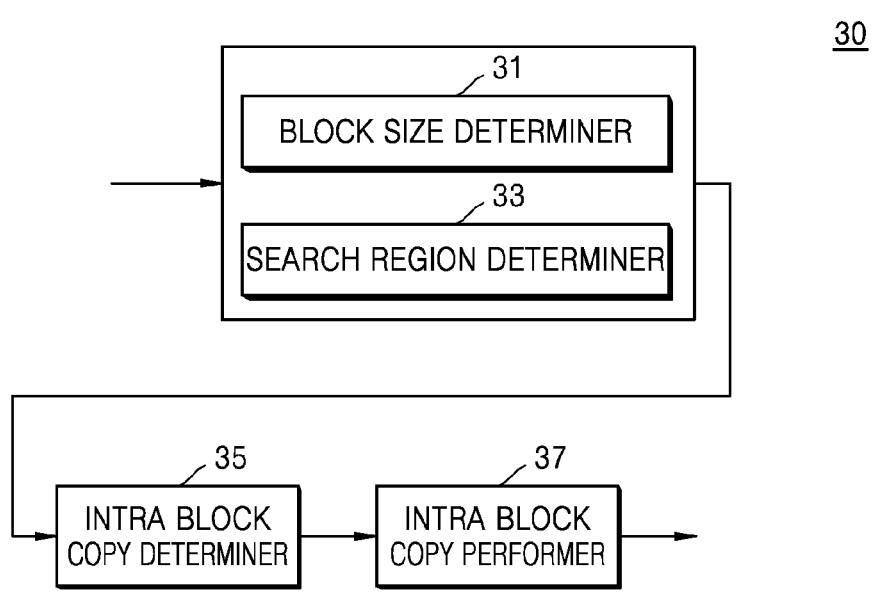
FIG. 3 illustrates a block diagram of an intra block copy predictor 30 included in a video decoding apparatus 200, according to various embodiments.

FIG. 3 illustrates a block diagram of an intra block copy predictor 30 included in a video decoding apparatus 200, according to various embodiments.

The intra block copy predictor 30 of the video decoding apparatus 200 according to various embodiments may include a block size determiner 31, a search region determiner 33, an intra block copy determiner 35, and an intra block copy performer 37.

The video decoding apparatus 200 according to various embodiments may receive bitstreams. The video decoding apparatus 200 may reconstruct images by using the received bitstream.

The video decoding apparatus 200 according to various embodiments may decode an image by using encoding symbols of a parsed image. If the video decoding apparatus 200 receives streams that are encoded based on coding units of a tree structure, the video decoding apparatus 200 may perform decoding on each largest coding unit of the bitstream, based on the coding units of the tree structure.

The video decoding apparatus 200 may perform entropy decoding on each largest coding unit, and thus may obtain encoding information and the encoded data. The video decoding apparatus 200 may perform inverse-quantization and inverse-transformation on the encoded data obtained from the bitstream, and thus may reconstruct residual data.

The video decoding apparatus 200 according to various embodiments may decode an image by using an intra block copy prediction technique. The intra block copy prediction technique is an effective technique for increasing encoding/decoding efficiency.

The video decoding apparatus 200 according to various embodiments may limit a size of a block to which the intra block copy prediction technique is to be applied, so as to increase decoding efficiency. For example, the video decoding apparatus 200 may limit the size of the block to which the intra block copy prediction technique is to be applied, based on a preset profile/level, obtained block size information, or combinations thereof.

Also, the video decoding apparatus 200 may limit a search region of a reference block that is used to perform the intra block copy prediction technique. For example, the video decoding apparatus 200 may limit a search range of the reference block to be used for the intra block copy prediction technique, based on a preset profile/level, obtained search region information, or combinations thereof.

Hereinafter, the operation of the video decoding apparatus 200 by taking into account intra block copy prediction will be described in detail with reference to FIG. 4.

Figure 4:
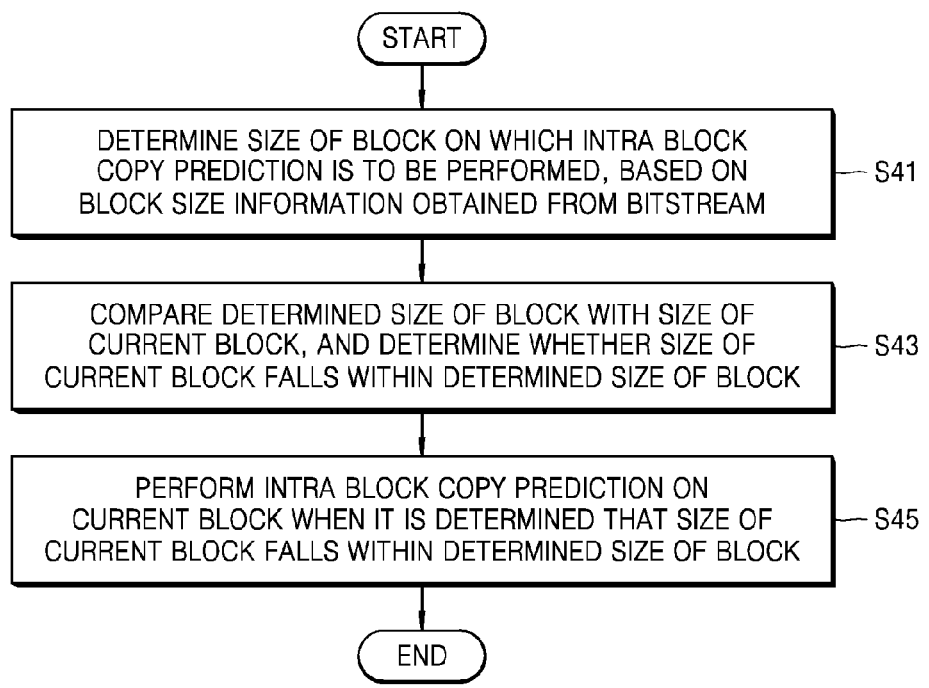
FIG. 4 is a flowchart of a method of decoding a video by using an intra block copy prediction technique, according to various embodiments.

FIG. 4 is a flowchart of a method of decoding a video by using an intra block copy prediction technique, according to various embodiments.

In operation 41, the block size determiner 31 may determine a size of a block on which intra block copy prediction is to be performed, based on obtained block size information.

According to various embodiments of the present invention, the video decoding apparatus 200 may obtain block size information including information about the size of the block to which the intra block copy prediction is to be applied. For example, the video decoding apparatus 200 may detect, from the bitstream, the block size information that is generated and encoded in the form of a syntax element.

According to various embodiments, the block size determiner 31 may determine the size of the block to which the intra block copy prediction is to be applied. For example, the block size determiner 31 may determine the size of the block to which the intra block copy prediction is to be applied, based on a preset profile/level, obtained block size information, or combinations thereof.

According to various embodiments, the block size determiner 31 may determine the size of the block to which the intra block copy prediction is to be applied, based on a preset profile/level. For example, in a case where a color format of 4:4:4 is set to the preset profile/level, the block size determiner 31 may determine "8×8 to 16×16" as the size of the block to which the intra block copy prediction is to be applied. Also, in a case where a color format of 4:2:0 is set to the preset profile/level, the block size determiner 31 may determine "8×8" as the size of the block to which the intra block copy prediction is to be applied.

The block size determiner 31 is not limited to the above embodiment and may determine various sizes as the size of the block to which the intra block copy prediction is to be applied. For example, the block size determiner 31 may determine 8×8, 16×16, above 8×8, below 16×16, or 8×8 to 16×16 as the size of the block to which the intra block copy prediction is to be applied, based on the preset profile/level.

According to various embodiments of the present invention, the block size determiner 31 may determine the size of the block to which the intra block copy prediction is to be applied, based on obtained block size information. For example, the block size determiner 31 may determine 8×8, 16×16, above 8×8, below 16×16, or 8×8 to 16×16 as the size of the block to which the intra block copy prediction is to be applied, based on the obtained block size information, but is not limited thereto According to various embodiments of the present invention, the block size determiner 31 may determine the size of the block to which the intra block copy prediction is to be applied, based on a combination of the preset profile/level and the obtained block size information. For example, the block size determiner 31 may determine a maximum size of the block to which the intra block copy prediction is to be applied, based on the preset profile/level, and may determine the size of the block to which the intra block copy prediction is to be applied, within the determined maximum size, based on the obtained block size information, but is not limited thereto.

According to various embodiments of the present invention, the video decoding apparatus 200 may obtain search region information indicating the search range of the reference block to be used for the intra block copy prediction. For example, the video decoding apparatus 200 may detect, from the bitstream, the search region information that is generated and encoded in the form of a syntax element.

According to various embodiments of the present invention, the search region determiner 33 may determine a search range of a reference block that is used to perform intra block copy prediction. For example, the search region determiner 33 may determine the search range of the reference block to be used for the intra block copy prediction, based on a preset profile/level, obtained search region information, or combinations thereof.

According to various embodiments of the present invention, the search region determiner 33 may determine the search range of the reference block to be used for the intra block copy prediction, based on the preset profile/level. For example, when a color format of 4:4:4 is set to the profile/level, the search region determiner 33 may determine two recently decoded largest coding units (LCUs) as the search range of the reference block. Also, when a color format of 4:2:0 is preset to the profile/level, the search region determiner 33 may determine an LCU including a current block as the search range of the reference block.

The search region determiner 33 is not limited to the above embodiment and may variously determine the search range of the reference block. For example, the search region determiner 33 may determine a current LCU, the current LCU and a left LCU, the current LCU and a rightmost fourth column of the left LCU, or an entire slice including all samples that have been decoded so far, as the search range of the reference block, based on the preset profile/level, but is not limited thereto.

According to various embodiments of the present invention, the search region determiner 33 may determine the search range of the reference block to be used for the intra block copy prediction, based on the obtained search region information. For example, the search region determiner 33 may determine a current LCU and a left LCU, the current LCU and a rightmost fourth column of the left LCU, or an entire slice including all samples that have been decoded so far, as the search range of the reference block, based on the obtained search region information, but is not limited thereto.

According to various embodiments of the present invention, the search region determiner 33 may determine the search range of the reference block to be used for the intra block copy prediction, based on a combination of the preset profile/level and the obtained search region information. For example, the search region determiner 33 may determine a maximum search range based on the preset profile/level, and determine the search range of the reference block within the determined maximum search range, based on the obtained search region information. Also, the search region determiner 33 may determine a maximum search range based on the preset profile/level, and determine a minimum search range based on the obtained search region information, but is not limited thereto.

In operation 43, the intra block copy determiner 35 may compare the determined size of the block with the size of the current block, and determine, based on a result of the comparing, whether the size of the current block falls within the determined size of the block.

According to various embodiments of the present invention, when the size of the block to which the intra block copy prediction is to be applied, which is determined by the block size determiner 31, has a specific value and the size of the current block is equal to the specific value, the intra block copy determiner 35 may determine that the size of the current block falls within the determined size of the block. For example, when the size of the block, which is determined by the block size determiner 31, is 8×8 and the size of the current block is 8×8, the intra block copy determiner 35 may determine that the size of the current block falls within the determined size of the block.

According to various embodiments, when the size of the block, which is determined by the block size determiner 31, is in a specific range and the size of the current block falls within the determined specific range, the intra block copy determiner 35 may determine that the size of the current block falls within the determined size of the block. For example, when the determined size of the block is "8×8 to 32×32" and the size of the current block is 16×16, it may be determined that the size of the current block falls within the determined size of the block.

In operation 45, when it is determined that the size of the current block falls within the determined size of the block, the intra block copy performer 37 may decode the current block by performing the intra block copy prediction on the current block.

According to various embodiments, when it is determined that the size of the current block falls within the determined size of the block, the intra block copy performer 37 may perform the intra block copy prediction. For example, the intra block copy performer 37 may detect a reference block indicated by a motion vector within a screen. Also, the intra block copy prediction may be performed on the current block by synthesizing data of the reference block determined within the screen and the obtained residual data.

According to various embodiments, when it is determined that the size of the current block falls within the determined size of the block, the intra block copy performer 37 may determine the reference block to be used for the intra block copy prediction. For example, the intra block copy performer 37 may determine the reference block within the search range determined by the search region determiner 33.

For example, when the search range determined by the search region determiner 33 is the current LCU, the intra block copy performer 37 may determine the reference block, which is indicated by the motion vector obtained from the bitstream, within the current LCU. Also, when the search range determined by the search region determiner 33 is the current LCU and the left LCU, the intra block copy performer 37 may determine the reference block, which is indicated by the motion vector obtained from the bitstream, within the current LCU and the left LCU.

According to various embodiments of the present invention, the intra block copy performer 37 may decode the current block by performing the intra block copy prediction on the current block by using the determined reference block. For example, the intra block copy performer 37 may determine the reference block, which is indicated by the obtained motion vector, within the determined search range, may perform the intra block copy prediction on the current block by synthesizing a sample value of the determined reference block and the obtained residual data, and thus may decode the current block.

The video decoding apparatus 200 according to an embodiment of the present invention may include a central processor (not shown) that generally controls the block size determiner 31, the search region determiner 33, the intra block copy determiner 35, and the intra block copy performer 37. Alternatively, each of the block size determiner 31, the search region determiner 33, the intra block copy determiner 35, and the intra block copy performer 37 may be driven by its own processor (not shown), and the processors (not shown) may interoperate with each other, so that the video decoding apparatus 200 may operate. Alternatively, according to control by an external processor (not shown) of the video decoding apparatus 200, the block size determiner 31, the search region determiner 33, the intra block copy determiner 35, and the intra block copy performer 37 may be controlled.

The video decoding apparatus 200 may include one or more data storage units (not shown) for storing input and output data of the block size determiner 31, the search region determiner 33, the intra block copy determiner 35, and the intra block copy performer 37. The video decoding apparatus 200 may include a memory controller (not shown) that manages an input and output of data of the one or more data storage units (not shown).

In order to output a video decoding result, the video decoding apparatus 200 may operate in connection with an internal video encoding processor or an external video decoding processor so as to perform a video decoding operation including transformation. The internal video encoding processor of the video decoding apparatus 200 may be a separate processor capable of performing a video decoding operation. Also, the video decoding apparatus 200, a central processing unit (CPU), or a graphics processing unit (GPU) includes a video decoding processing module and thus performs a basic video decoding operation.

Figure 5:
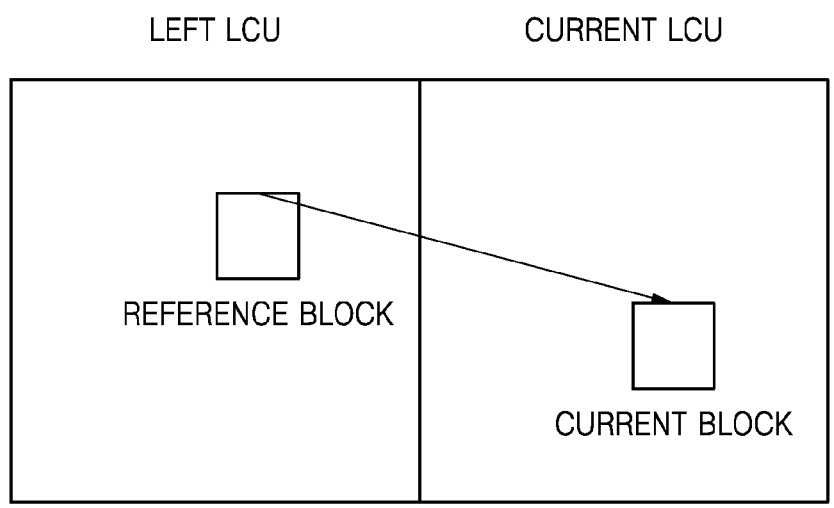
FIG. 5 is a diagram for describing a method of performing intra block copy prediction in a video decoding method, according to various embodiments.

FIG. 5 is a diagram for describing a method of performing intra block copy prediction in a video decoding method, according to various embodiments.

Referring to FIG. 5, the intra block copy performer 37 of the video decoding apparatus 200 may determine the reference block within the search range determined by the search region determiner 33.

When the search range determined by the search region determiner 33 is the current LCU and the left LCU, the intra block copy performer 37 of the video decoding apparatus 200 may determine the reference block, which is indicated by the motion vector data obtained from the bitstream, within the current LCU and the left LCU.

The intra block copy performer 37 of the video decoding apparatus 200 may decode the current block by synthesizing the sample value of the determined reference block and the residual data.

Figure 6:
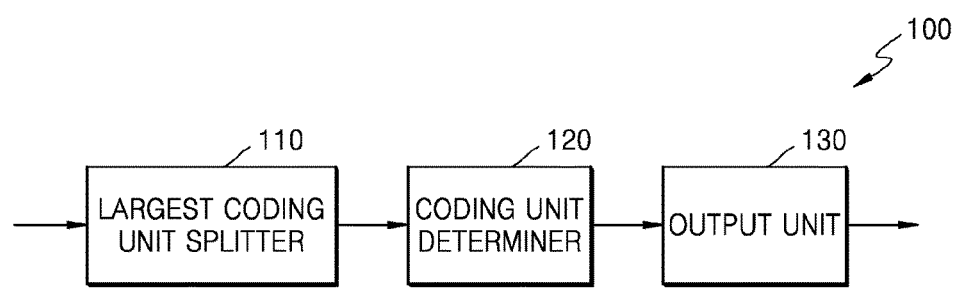
FIG. 6 illustrates a block diagram of a video encoding apparatus based on coding units of a tree structure, according to an embodiment.

FIG. 6 illustrates a block diagram of a video encoding apparatus based on coding units of a tree structure 100, according to an embodiment of the present invention.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the least encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to the embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions obtained by symmetrically splitting a height or width of the prediction unit, partitions obtained by asymmetrically splitting the height or width of the prediction unit, such as 1:n or n:1, partitions obtained by geometrically splitting the prediction unit, and partitions having arbitrary shapes, or the like.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 100 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 may determine not only a depth generating a least encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and information according to depths.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 130 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

According to the simplest embodiment for the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

Figure 7:
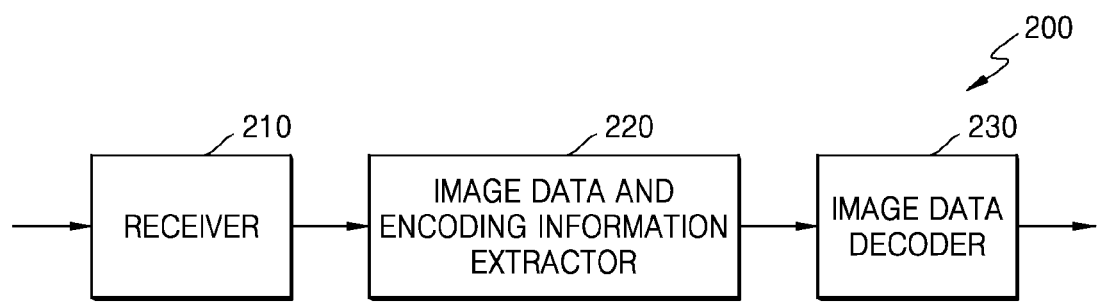
FIG. 7 illustrates a block diagram of a video decoding apparatus based on coding units of a tree structure, according to an embodiment.

FIG. 7 illustrates a block diagram of a video decoding apparatus based on coding units of a tree structure 200, according to various embodiments.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various types of split information for decoding operations of the video decoding apparatus 200 according to the embodiment are identical to those described with reference to FIG. 6 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and split information about the coding units having a tree structure according to each largest coding unit. The extracted final depth and the extracted split information are output to the image data decoder 230. That is, the image data in a bit stream is split into the largest coding unit so that the image data decoder 230 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the depth and the split information according to each of the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 8:
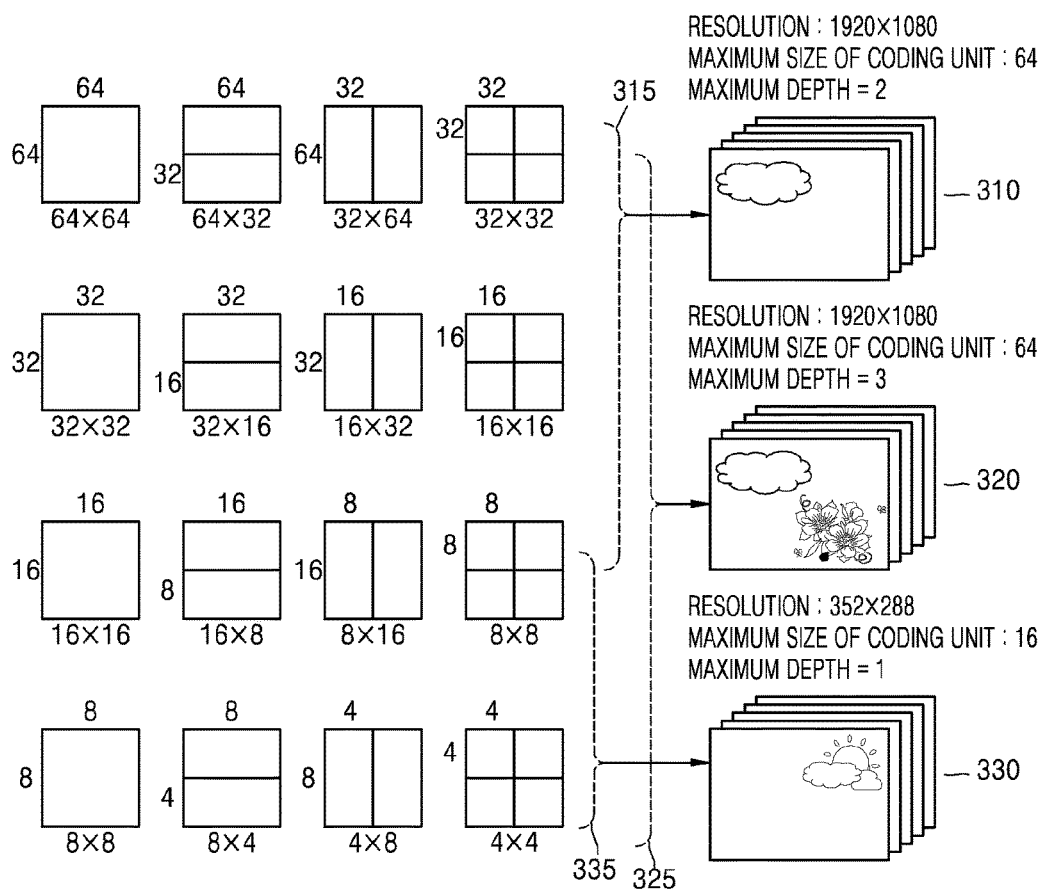
FIG. 8 illustrates a concept of coding units, according to an embodiment of the present invention.

FIG. 8 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 8 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 9:
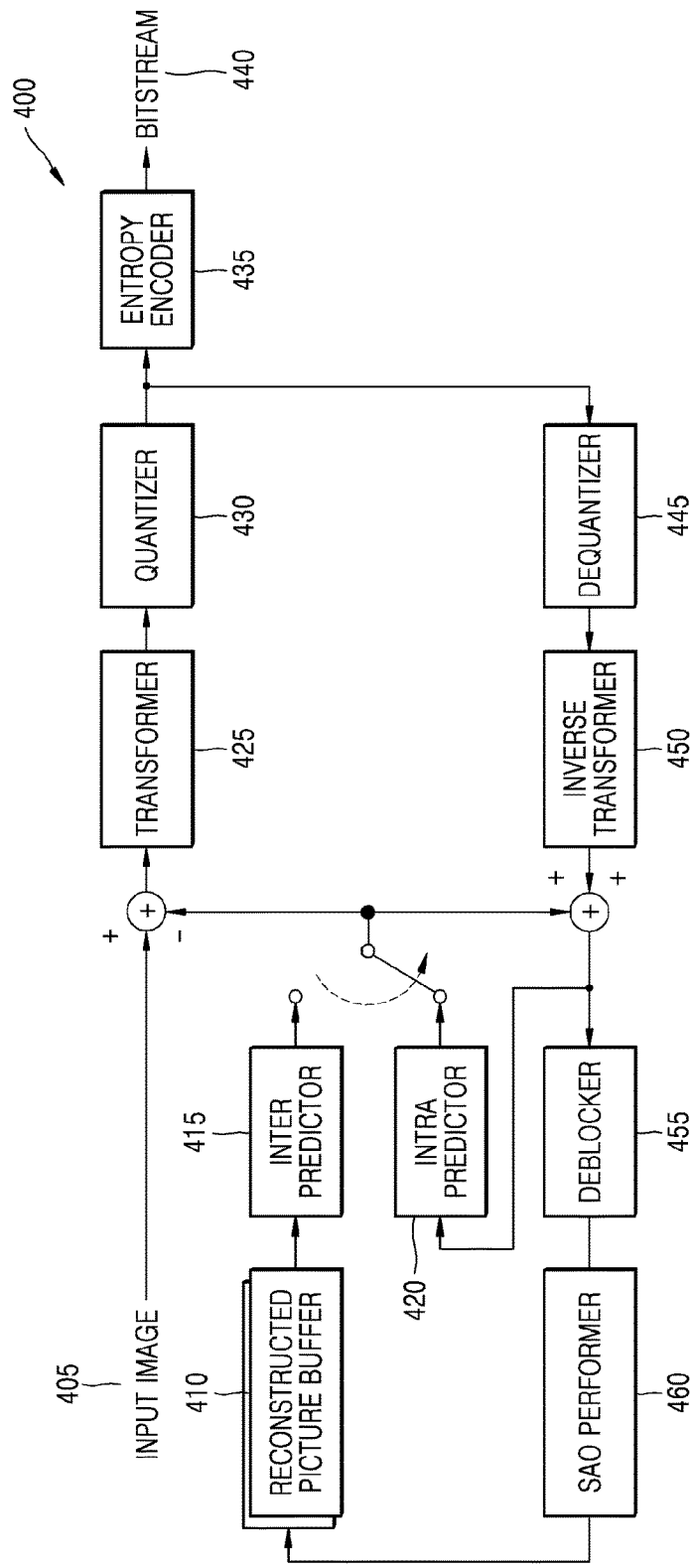
FIG. 9 illustrates a block diagram of an image encoder based on coding units, according to an embodiment of the present invention.

FIG. 9 illustrates a block diagram of an image encoder 400 based on coding units, according to various embodiments.

The image encoder 400 according to an embodiment performs operations of a picture encoder (not shown) of the video encoding apparatus 100 so as to encode image data. That is, an intra predictor 420 performs intra prediction on coding units in an intra mode, from among a current image 405, and an inter predictor 415 performs inter prediction on coding units in an inter mode by using the current image 405 and a reference image obtained from a reconstructed picture buffer 410 according to prediction units. The current image 405 may be split into largest coding units and then the largest coding units may be sequentially encoded. In this regard, the largest coding units that are to be split into coding units having a tree structure may be encoded.

Residual data is generated by removing prediction data regarding a coding unit of each mode which is output from the intra predictor 420 or the inter predictor 415 from data regarding an encoded coding unit of the current image 405, and the residual data is output as a quantized transformation coefficient according to transformation units through a transformer 425 and a quantizer 430. The quantized transformation coefficient is reconstructed as the residual data in a spatial domain through an inverse-quantizer 445 and an inverse-transformer 450. The reconstructed residual image data in the spatial domain is added to prediction data for the coding unit of each mode which is output from the intra predictor 420 or the inter predictor 415 and thus is reconstructed as data in a spatial domain for a coding unit of the current image 405. The reconstructed data in the spatial domain is generated as a reconstructed image through a deblocking unit 455 and a sample adaptive offset (SAO) performer 460 and the reconstructed image is stored in the reconstructed picture buffer 410. The reconstructed images stored in the reconstructed picture buffer 410 may be used as reference images for inter predicting another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the deblocking unit 455, and the SAO performer 460, may perform operations based on each coding unit among coding units having a tree structure according to each largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quadtree in each coding unit from among the coding units having a tree structure.

Figure 10:
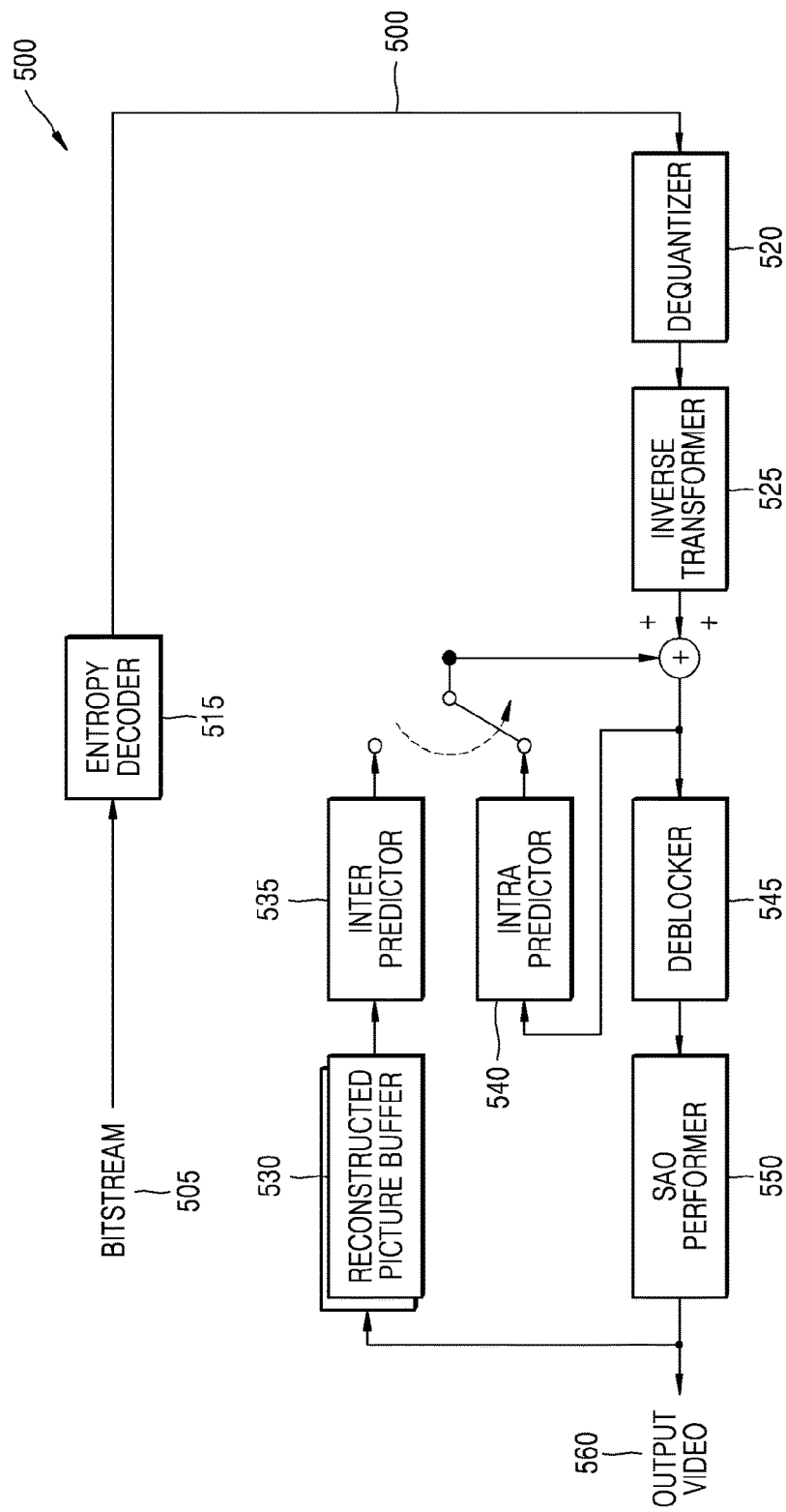
FIG. 10 illustrates a block diagram of an image decoder based on coding units, according to an embodiment of the present invention.

FIG. 10 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Reconstructed images stored in the reconstructed picture buffer 530 may be output as reference images.

In order for a picture decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the deblocking unit 545, and the SAO performer 550 may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quadtree in each coding unit.

Figure 11:
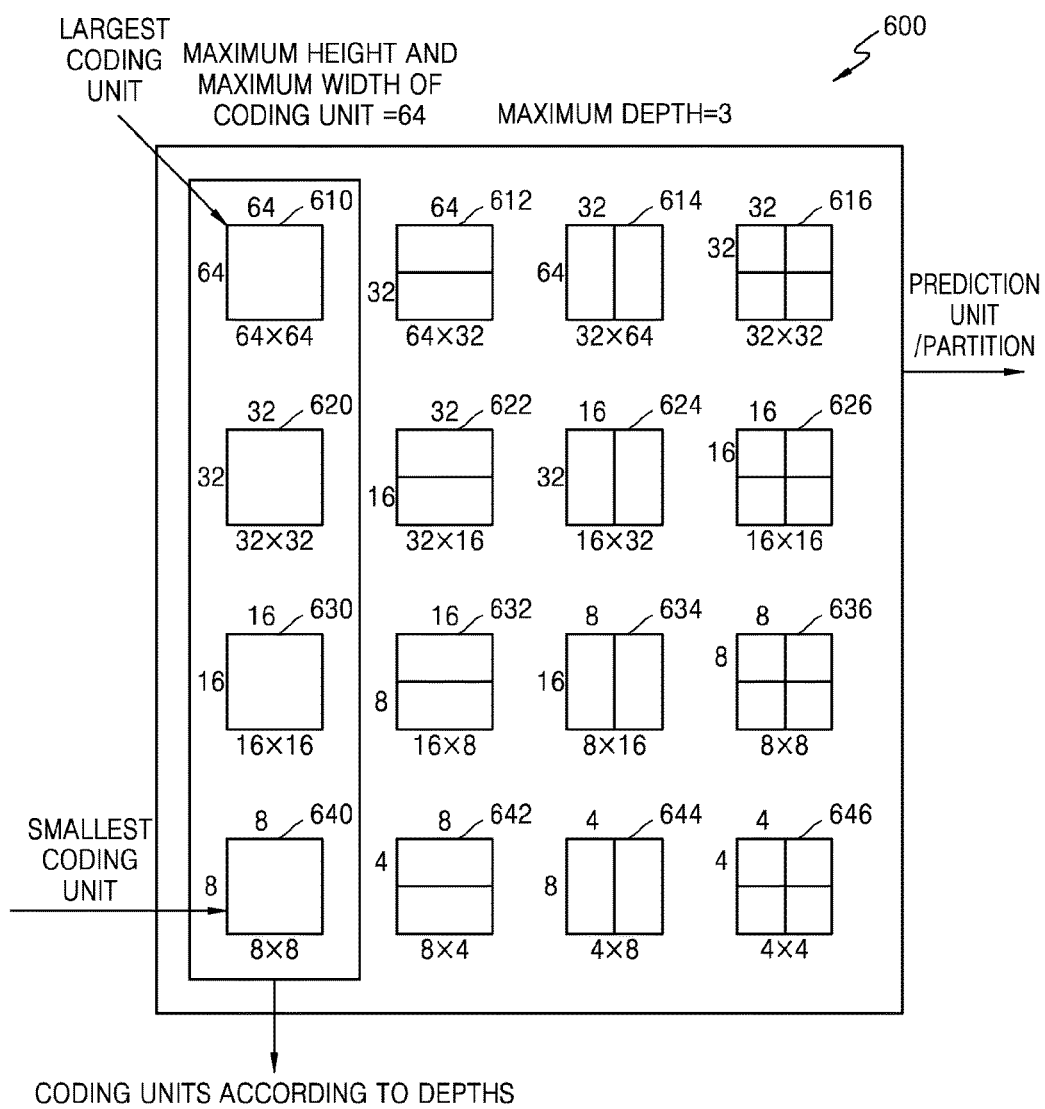
FIG. 11 illustrates deeper coding units according to depths, and partitions, according to an embodiment of the present invention.

FIG. 11 illustrates deeper coding units according to depths, and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

Figure 12:
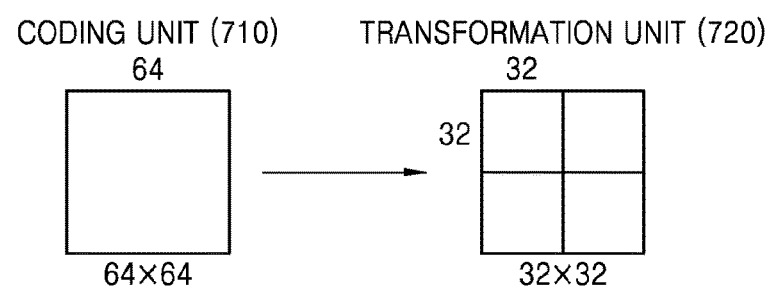
FIG. 12 illustrates a relationship between a coding unit and transformation units, according to an embodiment of the present invention.

FIG. 12 illustrates a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 13:
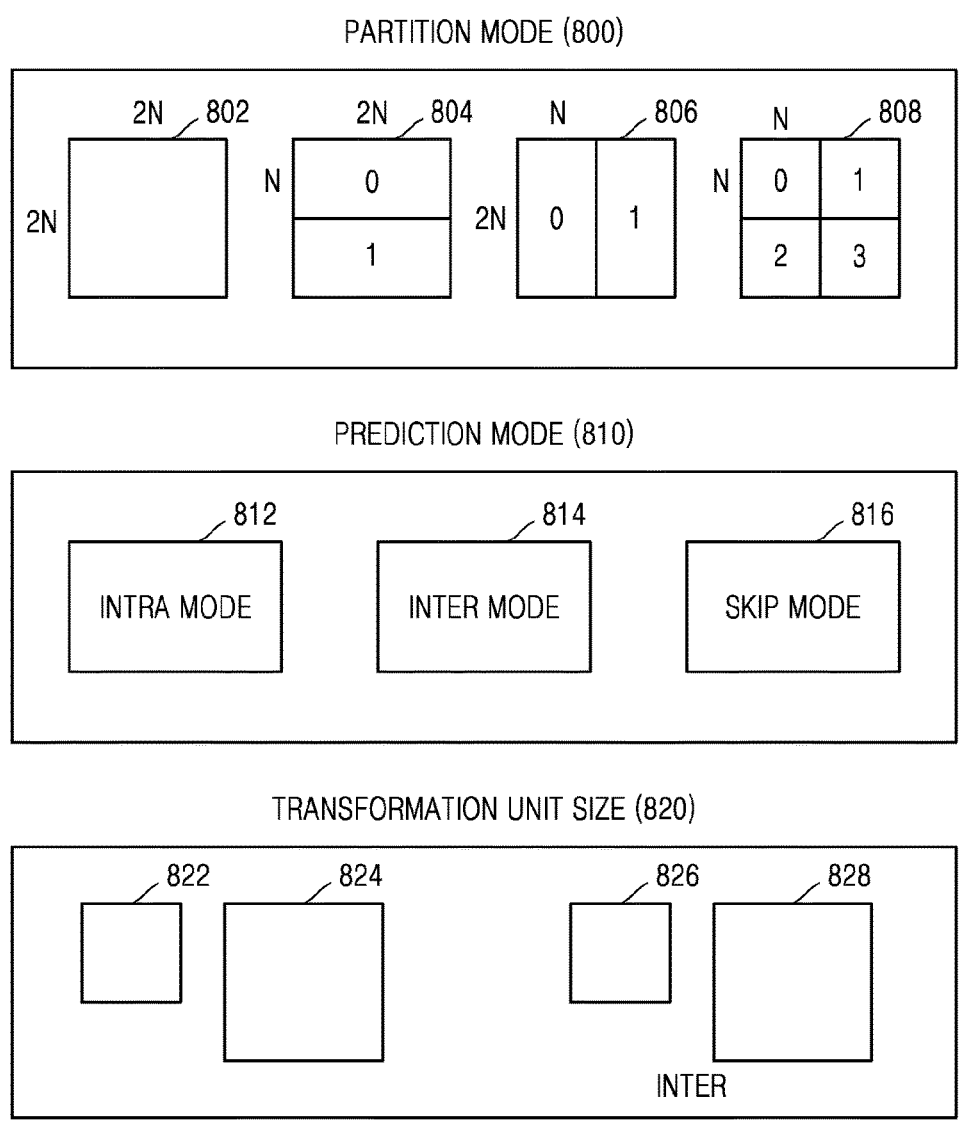
FIG. 13 illustrates a plurality of pieces of encoding information according to depths, according to an embodiment of the present invention.

FIG. 13 illustrates a plurality of pieces of encoding information according to depths, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second inter transformation unit 828.

The image data and encoding information extractor 210 of the video decoding apparatus 200 may extract and use the partition mode information 800, the prediction mode information 810, and the transformation unit size information 820 for decoding, according to each deeper coding unit.

Figure 14:
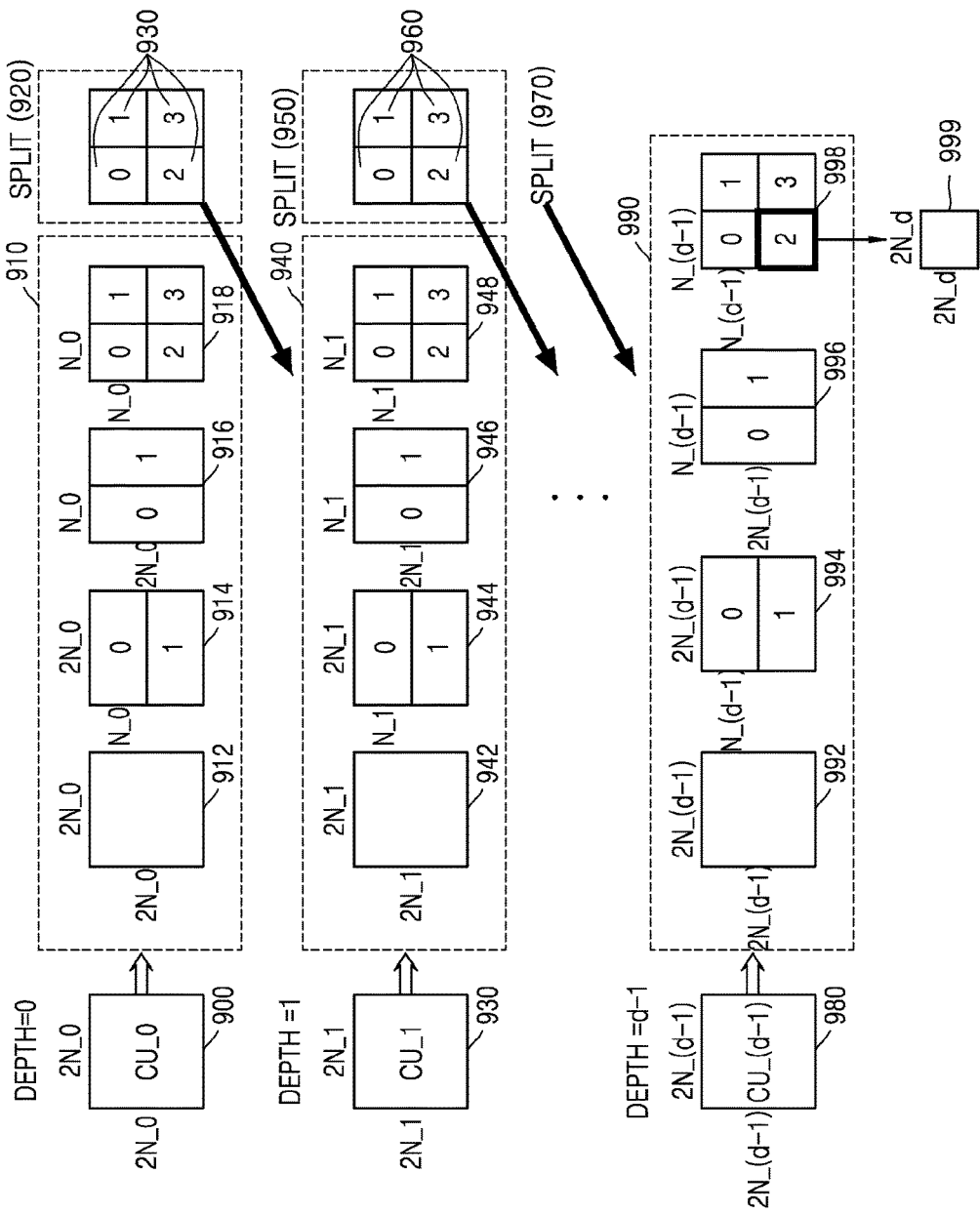
FIG. 14 illustrates deeper coding units according to depths, according to an embodiment of the present invention.

FIG. 14 illustrates deeper coding units according to depths, according to various embodiments.

Split information may be used to represent a change in a depth. The spilt information specifies whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth having the least encoding error by comparing encoding errors according to depths of the coding unit 900 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, split information about the corresponding depth.

Figure 15:
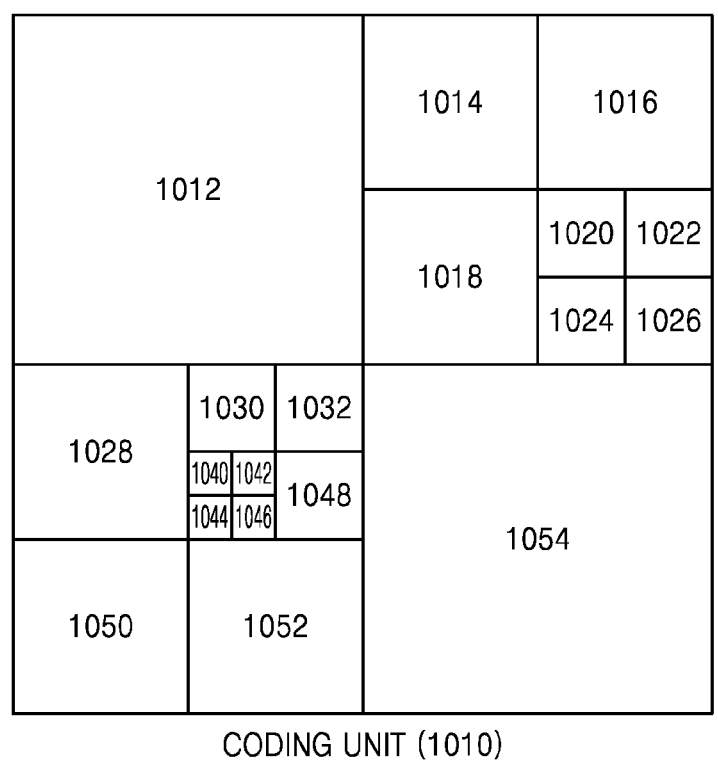
FIGS. 15, 16, and 17 illustrate a relationship between coding units, prediction units, and transformation units, according to an embodiment of the present invention.
Figure 16:
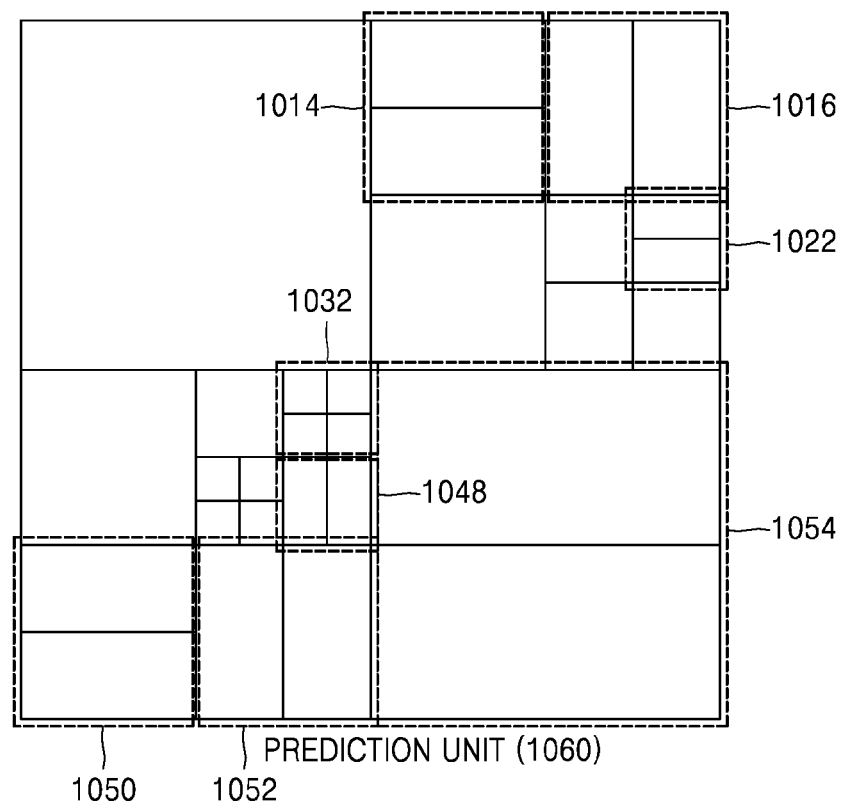
Figure 17:
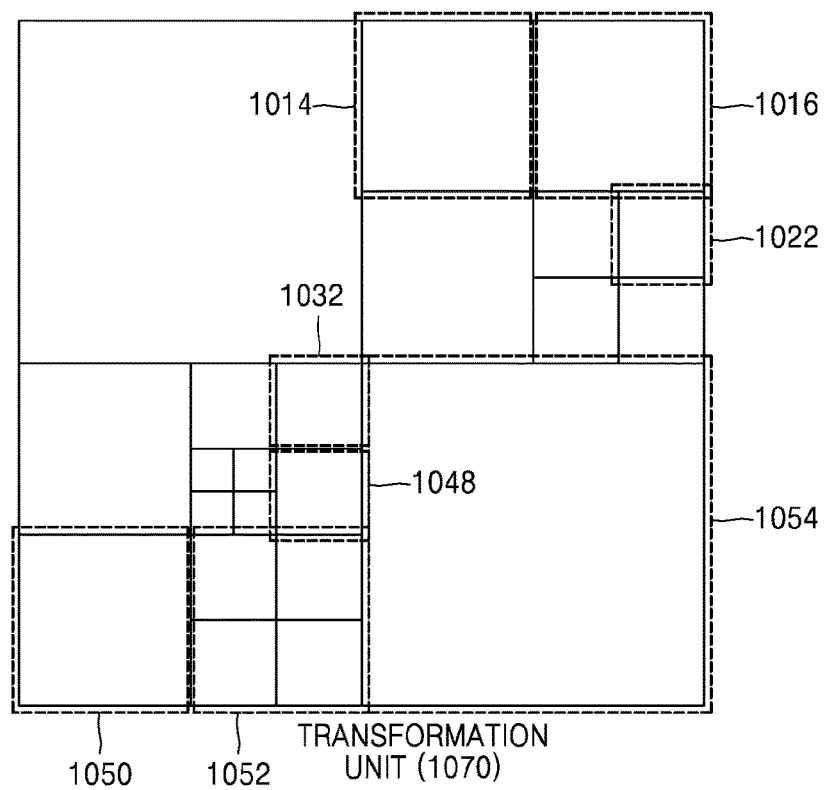

FIGS. 15, 16, and 17 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1060 are data units different from those in the prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to the embodiments.

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

TABLE 1

Split Information 0
(Encoding on Coding Unit having Size of 2N × 2N and Current Depth of d)

| Prediction Mode | Partition Type | | Size of Transformation Unit | | Split Information 1 |
| --- | --- | --- | --- | --- | --- |
| | Symmetrical Partition Type | Asymmetrical Partition Type | Split Information 0 of Transformation Unit | Split Information 1 of Transformation Unit | |
| Intra<br>Inter<br>Skip (Only 2N × 2N) | 2N × 2N<br>2N × N<br>N × 2N<br>N × N | 2N × nU<br>2N × nD<br>nL × 2N<br>nR × 2N | 2N × 2N | N × N<br>(Symmetrical Partition Type)<br>N/2 × N/2<br>(Asymmetrical Partition Type) | Repeatedly Encode Coding Units having Lower Depth of d + 1 |

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 18:
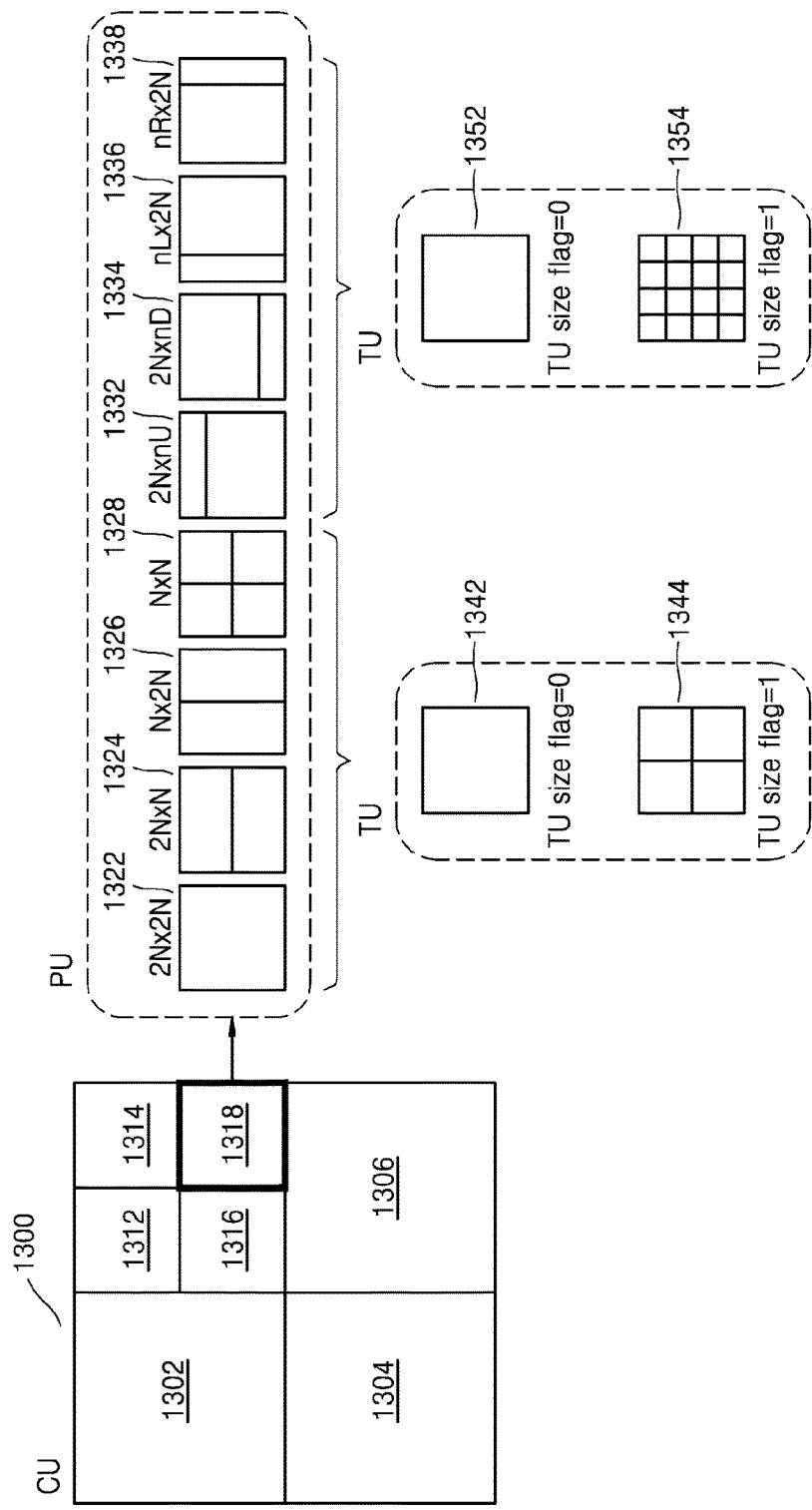
FIG. 18 illustrates a relationship between a coding unit, a prediction unit, and a transformation unit, according to encoding mode information of Table 1.

FIG. 18 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 18 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMin}Tu\text{Size} = \max(\text{MinTransformSize}, \text{Root}Tu\text{Size}/(2^{\wedge}\text{MaxTransformSizeIndex})) \qquad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{Root}Tu\text{Size} = \min(\text{MaxTransformSize}, PU\text{Size}) \qquad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{Root}TuSize = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 6 through 18, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

A computer-readable recording medium storing a program, e.g., a disc 26000, according to an embodiment will now be described in detail.

Figure 19:
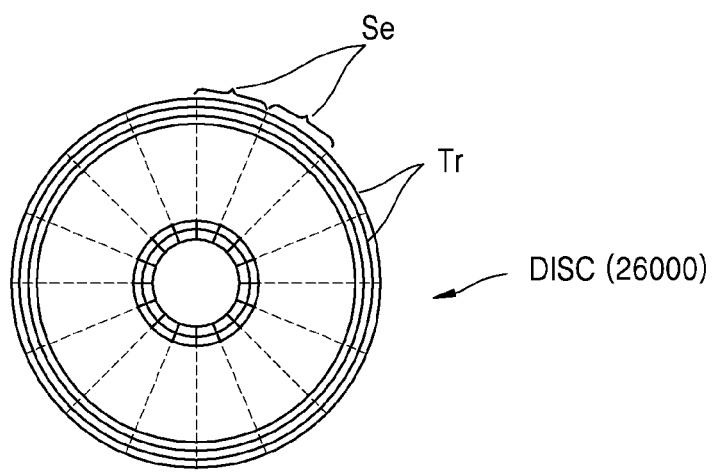
FIG. 19 illustrates a physical structure of a disc in which a program is stored, according to an embodiment.

FIG. 19 illustrates a physical structure of the disc 26000 in which a program is stored, according to various embodiments. The disc 26000, as a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 20:
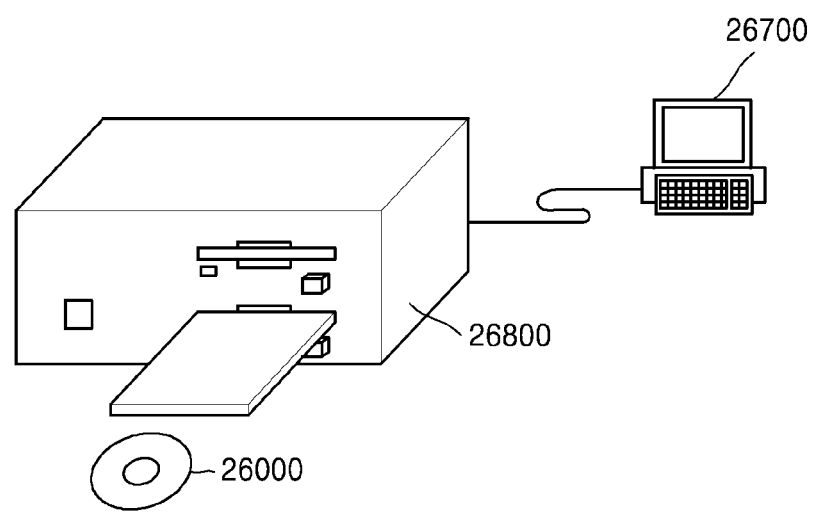
FIG. 20 illustrates a disc drive for recording and reading a program by using the disc.

FIG. 20 illustrates a disc drive 26800 for recording and reading a program by using the disc 26000.

A computer system 26700 may store a program that executes at least one of the video encoding method and the video decoding method of the present invention, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method of the present invention may be stored not only in the disc 26000 illustrated in FIGS. 19 and 20 but may also be stored in a memory card, a ROM cassette, or a solid state drive (SSD).

A system to which the video encoding method and the video decoding method according to the embodiments described above are applied will be described below.

Figure 21:
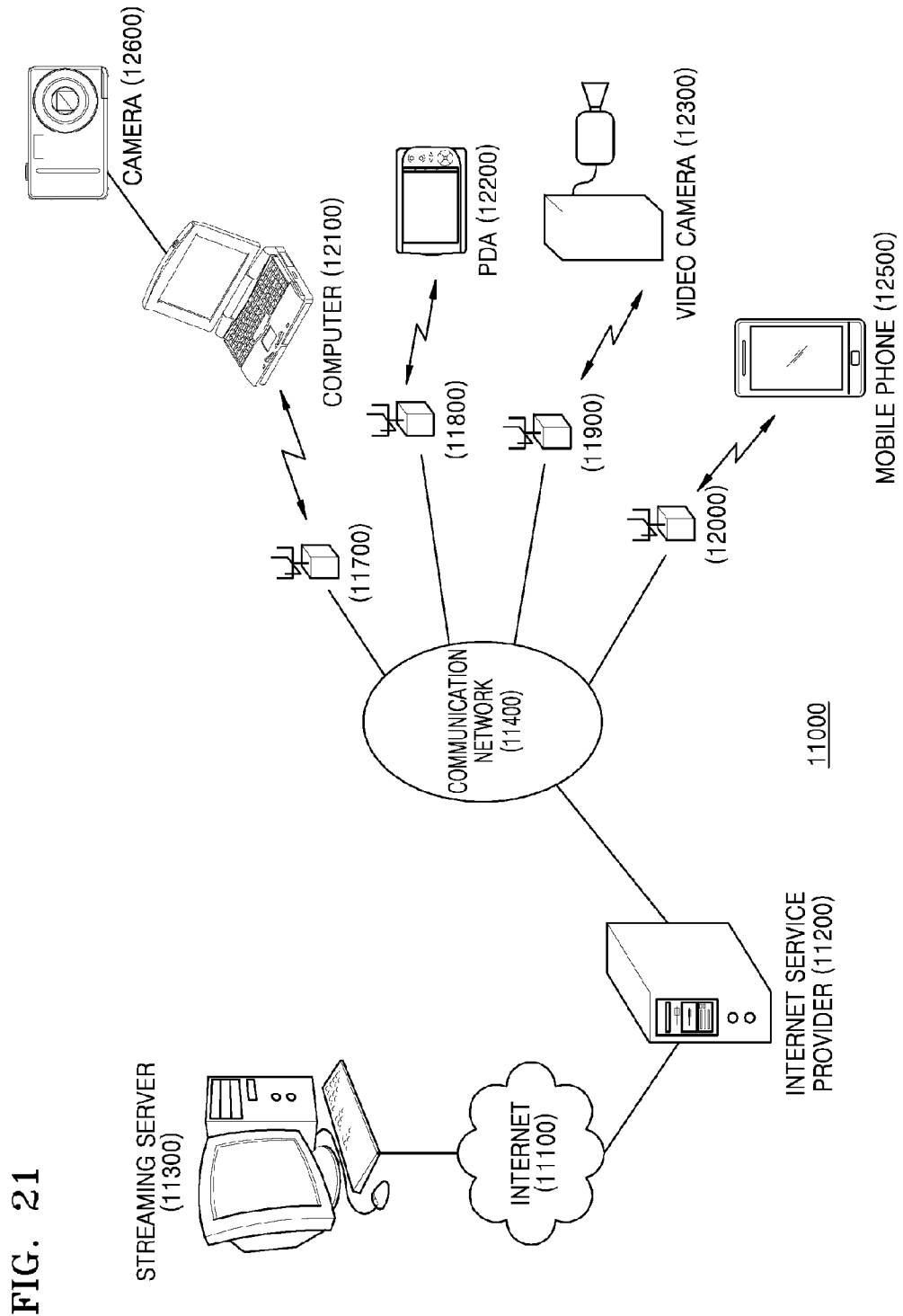
FIG. 21 illustrates an overall structure of a content supply system for providing a content distribution service.

FIG. 21 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
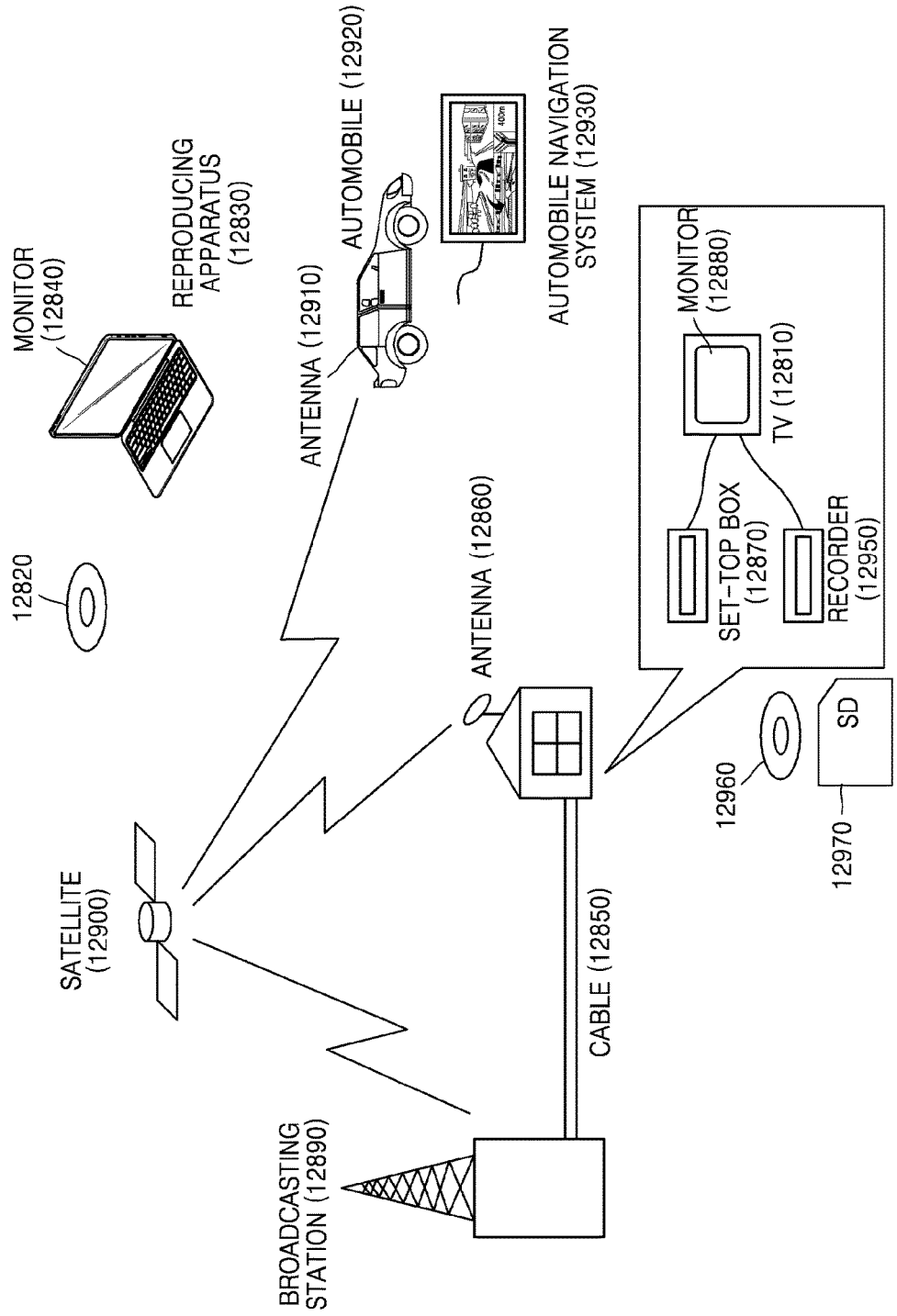
FIG. 24 illustrates a digital broadcasting system employing a communication system according to the present invention.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of the video encoding apparatus and the video decoding apparatus of the present invention.

Figure 22:
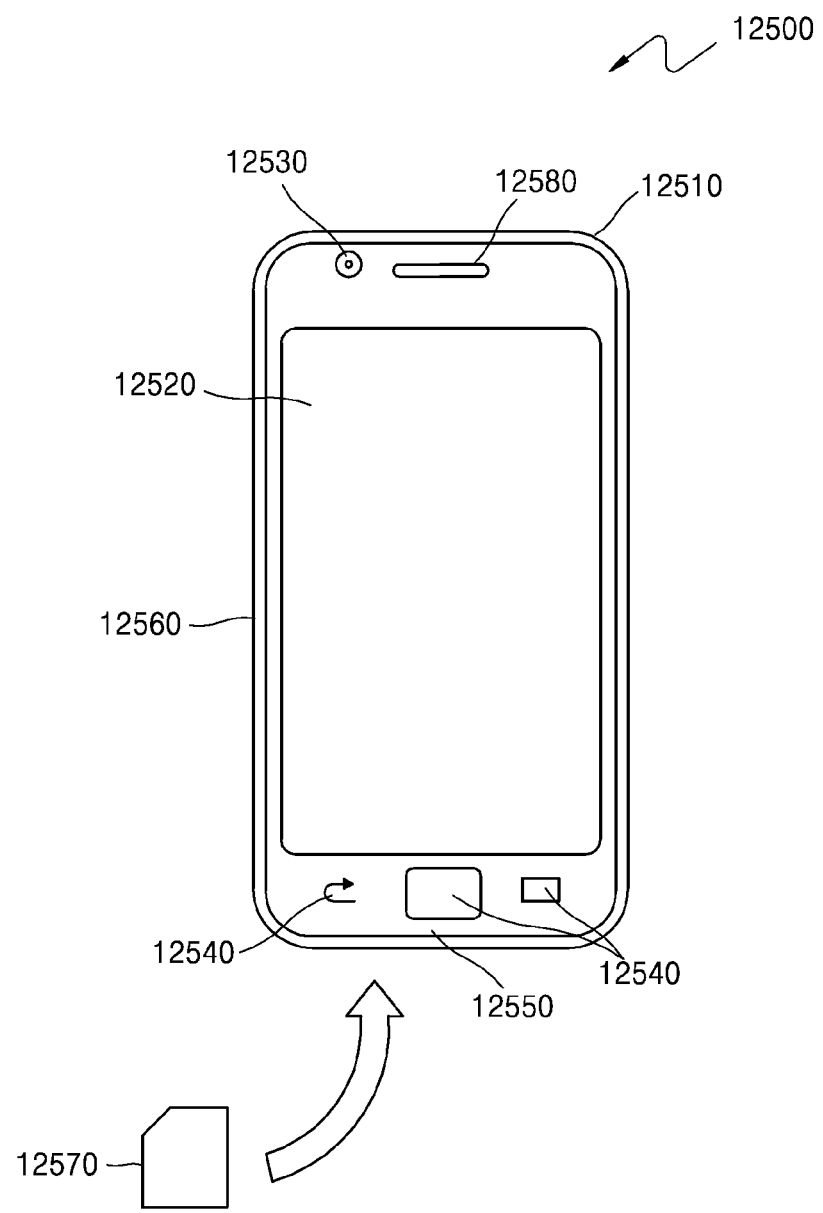
FIGS. 22 and 23 illustrate external and internal structures of a mobile phone to which a video encoding method and a video decoding method of the present invention are applied, according to an embodiment.
Figure 23:
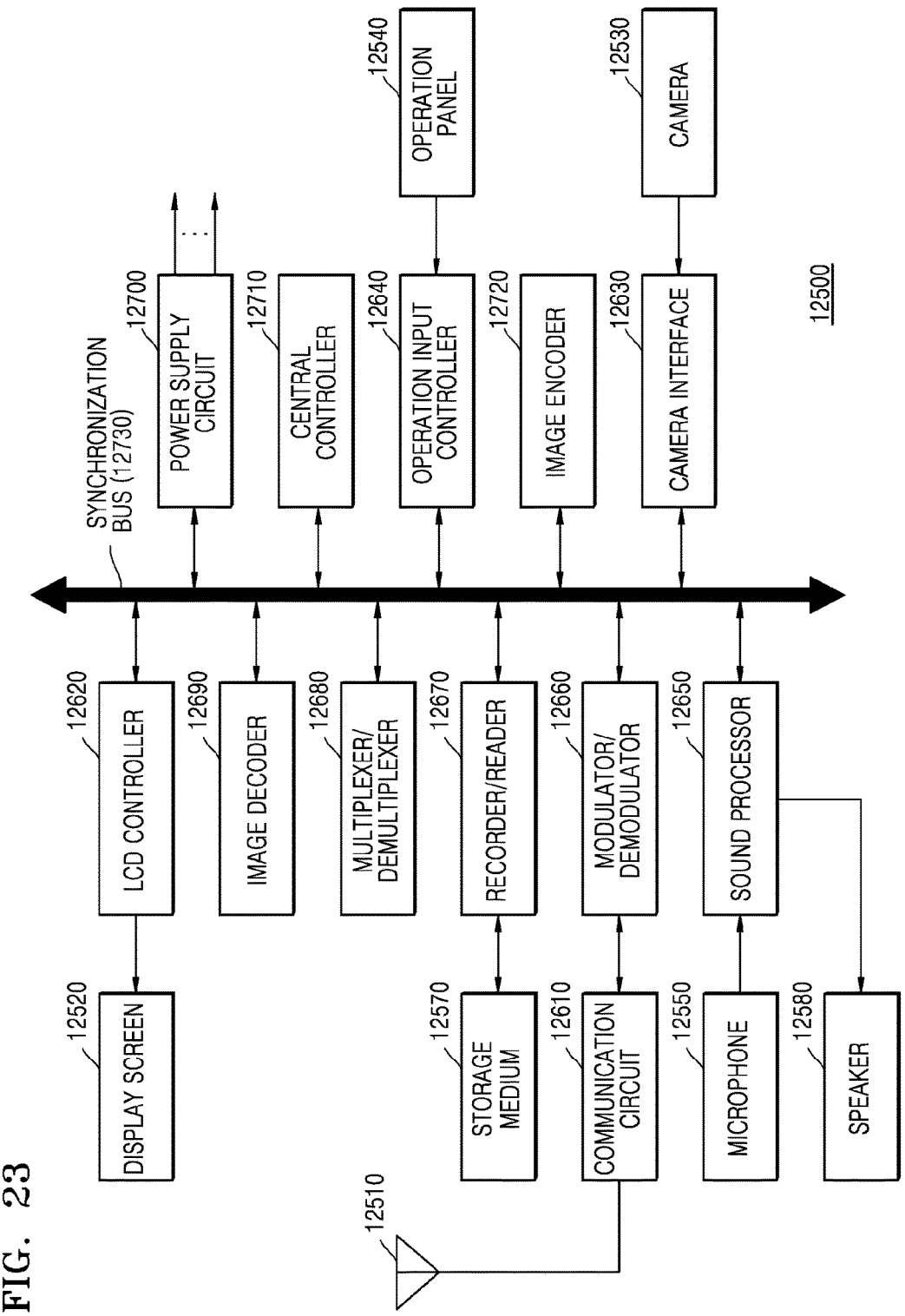

With reference to FIGS. 22 and 23, the mobile phone 12500 included in the content supply system 11000 according to an embodiment will now be described in detail.

FIG. 22 illustrates an external structure of the mobile phone 12500 to which a video encoding method and a video decoding method are applied, according to various embodiments.

The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 23 illustrates an internal structure of the mobile phone 12500.

In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method of the present invention.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transmitting terminal including only the video encoding apparatus, or may be a receiving terminal including only the video decoding apparatus.

A communication system according to an embodiment is not limited to the communication system described above with reference to FIG. 23. For example, FIG. 24 illustrates a digital broadcasting system employing a communication system, according to various embodiments. The digital broadcasting system of FIG. 24 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present invention is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present invention may be installed. Data output from the set-top box 12870 may also be reproduced on a TV monitor 12880.

As another example, the video decoding apparatus of the present invention may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present invention and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 29. For example, the computer 12100 and the TV receiver 12810 may not include the camera 12530, the camera interface 12630, and the image encoder 12720 of FIG. 29.

Figure 25:
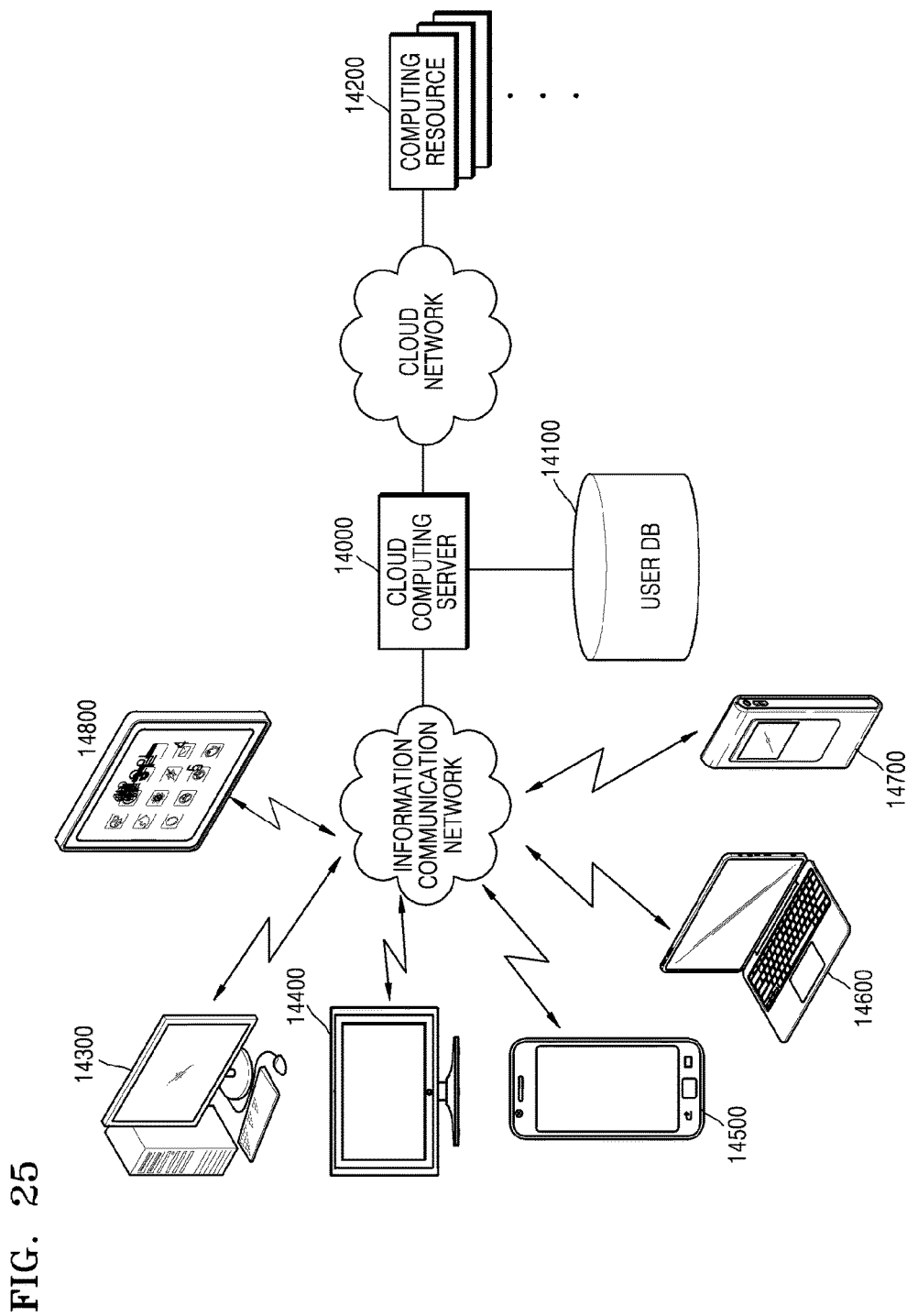
FIG. 25 illustrates a network structure of a cloud computing system using a video encoding apparatus and a video decoding apparatus, according to an embodiment of the present invention.

FIG. 25 illustrates a network structure of a cloud computing system using a video encoding apparatus and a video decoding apparatus, according to various embodiments.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

Here, the user terminal may include the video decoding apparatus as described above with reference to FIGS. 1 through 18. As another example, the user terminal may include the video encoding apparatus as described above with reference to FIGS. 1 through 18. Alternatively, the user terminal may include both the video encoding apparatus and the video decoding apparatus as described above with reference to FIGS. 1 through 18.

Various applications of the video encoding method, the video decoding method, the video encoding apparatus, and the video decoding apparatus described above with reference to FIGS. 1 through 18 are described above with reference to FIGS. 19 through 25. However, various embodiments of methods of storing the video encoding method and the video decoding method in a storage medium or various embodiments of methods of implementing the video encoding apparatus and the video decoding apparatus in a device described above with reference to FIGS. 1 through 18 are not limited to the embodiments of FIGS. 19 through 25.

While the present invention has been particularly shown and described with reference to exemplary embodiments thereof, it will be understood by those of ordinary skill in the art that various changes in form and details may be made therein without departing from the spirit and scope of the following claims. Therefore, the exemplary embodiments should be considered in a descriptive sense only and not for purposes of limitation. The scope of the present invention is defined not by the detailed description of the present invention but by the appended claims, and all differences within the scope will be construed as being included in the present invention.

The invention claimed is:

1. A video decoding method comprising:
   determining a range of a size of a block on which intra block copy prediction is to be performed, based on block size information obtained from a bitstream;
   comparing the determined range of the size of the block with a size of a current block, and determining, based on a result of the comparing, whether the size of the current block falls within the determined range of the size of the block; and
   performing intra block copy prediction on the current block when it is determined that the size of the current block falls within the determined range of the size of the block.

2. The video decoding method of claim 1, further comprising determining a search range of a reference block corresponding to the current block, based on search region information obtained from the bitstream,
   wherein the performing of the intra block copy prediction comprises:
   determining a reference block indicated by a motion vector within the determined search range; and
   performing the intra block copy prediction on the current block by using the determined reference block.

3. The video decoding method of claim 1, wherein the determining the range of the size of the block comprises determining the range of the size of the block based on a preset profile/level or a combination of the preset profile/level and the block size information.

4. The video decoding method of claim 1, wherein the block size information is generated based on a user input or characteristics of an input image.

5. The video decoding method of claim 2, wherein the determining of the search range comprises determining the search range based on a preset profile/level or a combination of the preset profile/level and the search region information.

6. The video decoding method of claim 2, wherein the determined search range is an entire slice including all samples that have been decoded so far.

7. The video decoding method of claim 2, wherein the determined search range is at least one of a largest coding unit (LCU) including the current block and a largest coding unit (LCU) adjacent to the current block.

8. A video encoding method comprising:
   determining a range of a size of a block on which intra block copy prediction is to be performed, and generating block size information based on the determined range of the size of the block;
   comparing the determined range of the size of the block with a size of a current block, and determining, based on a result of the comparing, whether the size of the current block falls within the determined range of the size of the block;

performing intra block copy prediction on the current block when it is determined that the size of the current block falls within the determined range of the size of the block; and generating a bitstream including the block size information, and residual data and motion vector data that are generated as a result of performing the intra block copy prediction.

9. The video encoding method of claim 8, further comprising determining a search range of a reference block corresponding to the current block, and generating search region information based on the search range, wherein the performing of the intra block copy prediction comprises detecting a reference block within the determined search range, and performing intra block copy prediction on the current block by using the detected reference block, and the generating of the bitstream comprises generating the bitstream that further includes the search region information.

10. The video encoding method of claim 8, wherein the determined range of the size of the block is determined based on a preset profile/level, characteristics of an input image, a user input, or combinations thereof.

11. The video encoding method of claim 9, wherein the determined search range is determined based on a preset profile/level, characteristics of an input image, a user input, or combinations thereof.

12. The video encoding method of claim 9, wherein the determined search range is at least one of a largest coding unit (LCU) including the current block and a largest coding unit (LCU) adjacent to the current block.

13. A video decoding apparatus comprising at least one processor configured to:

determine a range of a size of a block on which intra block copy prediction is to be performed, based on block size information obtained from a bitstream;

compare the determined range of the size of the block with a size of a current block, and determine, based on a result of the comparing, whether the size of the current block falls within the determined range of the size of the block; and perform intra block copy prediction on the current block when it is determined that the size of the current block falls within the determined range of the size of the block.

* * * * *